US010976534B2

(12) United States Patent
Steinmeyer et al.

(10) Patent No.: US 10,976,534 B2
(45) Date of Patent: Apr. 13, 2021

(54) LIGHT MICROSCOPE AND METHOD FOR RECORDING IMAGES WITH A LIGHT MICROSCOPE

(71) Applicant: Carl Zeiss Microscopy GmbH, Jena (DE)

(72) Inventors: Ralf Steinmeyer, Hannover (DE); Peter Schoen, Goettingen (DE); Matthias Langhorst, Gilching OT Argelsried (DE); Cornelia Bendlin, Goettingen (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 345 days.

(21) Appl. No.: 15/788,918

(22) Filed: Oct. 20, 2017

(65) Prior Publication Data

US 2018/0039058 A1   Feb. 8, 2018

Related U.S. Application Data

(63) Continuation of application No. 13/850,519, filed on Mar. 26, 2013.

(30) Foreign Application Priority Data

Mar. 28, 2012   (DE) .......................... 102012006350.4
Mar. 6, 2013   (DE) .......................... 102013003900.2

(51) Int. Cl.
*G02B 21/36* (2006.01)
*G02B 21/14* (2006.01)
*G02B 21/34* (2006.01)

(52) U.S. Cl.
CPC ........... *G02B 21/361* (2013.01); *G02B 21/14* (2013.01); *G02B 21/34* (2013.01)

(58) Field of Classification Search
CPC ........................... H04B 17/0085; H04L 1/244
(Continued)

(56) References Cited

U.S. PATENT DOCUMENTS 3,125,624 A   3/1964 Illig et al.
4,342,905 A   8/1982 Fujii et al.
(Continued)

FOREIGN PATENT DOCUMENTS

DE    19609288 A1    9/1996
DE    102010042351 A1    4/2012
(Continued)

OTHER PUBLICATIONS

Quantitative phase-gradient imaging at high resolution with asymmetric illumination-based differential phase contrast, Optics Letters, vol. 34, No. 13 (2009), pp. 1924-1926.
(Continued)

*Primary Examiner* — Jamie J Atala
*Assistant Examiner* — Kathleen V Nguyen
(74) *Attorney, Agent, or Firm* — Hoffman Warnick LLC

(57) ABSTRACT

The invention relates to a method for recording images with a light microscope, wherein a specimen container with a specimen is arranged on a specimen holder of the light microscope, and wherein illuminating light is guided onto the specimen. The illuminating light can hereby be cut in a cross-section transversely to an optical axis of the light microscope through a wall of the specimen container to a limited cross-sectional region. First and second diaphragm settings are determined and set, for the limited cross-sectional region of the illuminating light defined by the wall of the specimen container, in which the diaphragm covers equal sized portions of the limited cross-sectional region. In addition the invention relates to a light microscope which is adapted in particular to carry out the method.

20 Claims, 10 Drawing Sheets

(58) Field of Classification Search
USPC .......................................................... 348/79
See application file for complete search history.

(56) References Cited

U.S. PATENT DOCUMENTS

| | | | | |
|---|---|---|---|---|
| 5,751,475 | A * | 5/1998 | Ishiwata | G02B 21/14 |
| | | | | 359/371 |
| 5,912,763 | A | 6/1999 | Spink | |
| 5,969,855 | A | 10/1999 | Ishiwata et al. | |
| 6,067,135 | A * | 5/2000 | Shimizu | G02F 1/1334 |
| | | | | 349/86 |
| 2002/0090218 | A1* | 7/2002 | Kojima | G03B 7/08 |
| | | | | 396/432 |
| 2003/0030902 | A1* | 2/2003 | Fukushima | G02B 21/086 |
| | | | | 359/388 |
| 2003/0043356 | A1 | 3/2003 | Shiraishi | |
| 2004/0207915 | A1* | 10/2004 | Kaneda | G02B 21/16 |
| | | | | 359/388 |
| 2004/0223214 | A1 | 11/2004 | Atkinson | |
| 2005/0168808 | A1* | 8/2005 | Ishiwata | G02B 21/14 |
| | | | | 359/368 |
| 2007/0008536 | A1* | 1/2007 | Mitani | G01N 21/6408 |
| | | | | 356/417 |
| 2009/0168158 | A1* | 7/2009 | Schwertner | G02B 21/0024 |
| | | | | 359/385 |
| 2009/0180179 | A1* | 7/2009 | Ryu | G02B 21/367 |
| | | | | 359/383 |
| 2010/0182427 | A1* | 7/2010 | Jiang | B01L 9/523 |
| | | | | 348/135 |
| 2012/0086795 | A1* | 4/2012 | Weiss | G02B 21/082 |
| | | | | 348/79 |

FOREIGN PATENT DOCUMENTS

| | | |
|---|---|---|
| EP | 13001524.1 B1 | 3/2013 |
| JP | 2010271537 A | 12/2010 |
| WO | 03057922 A1 | 7/2003 |

OTHER PUBLICATIONS

Mehta et al.; "Asymmetric Illumination Based Differential Phase Contrast (AI-DPG) for Full-Field Transmission Imaging of Phase Information in Biological Specimens"; Apr. 13-16, 2008; 1 page.

Application No. EP 13001524; Search Report; dated May 22, 2013; 3 pages.

German Application No. 102013003900.2; GPTO Search Report; dated Feb. 17, 2014; 5 pages.

Application No. EP 13001524; Communication Under EPO Rule 71(3); dated Feb. 20, 2014; 6 pages.

Final Office Action dated Jul. 21, 2017 for U.S. Appl. No. 13/850,519, filed Mar. 26, 2013; pp. 46.

* cited by examiner

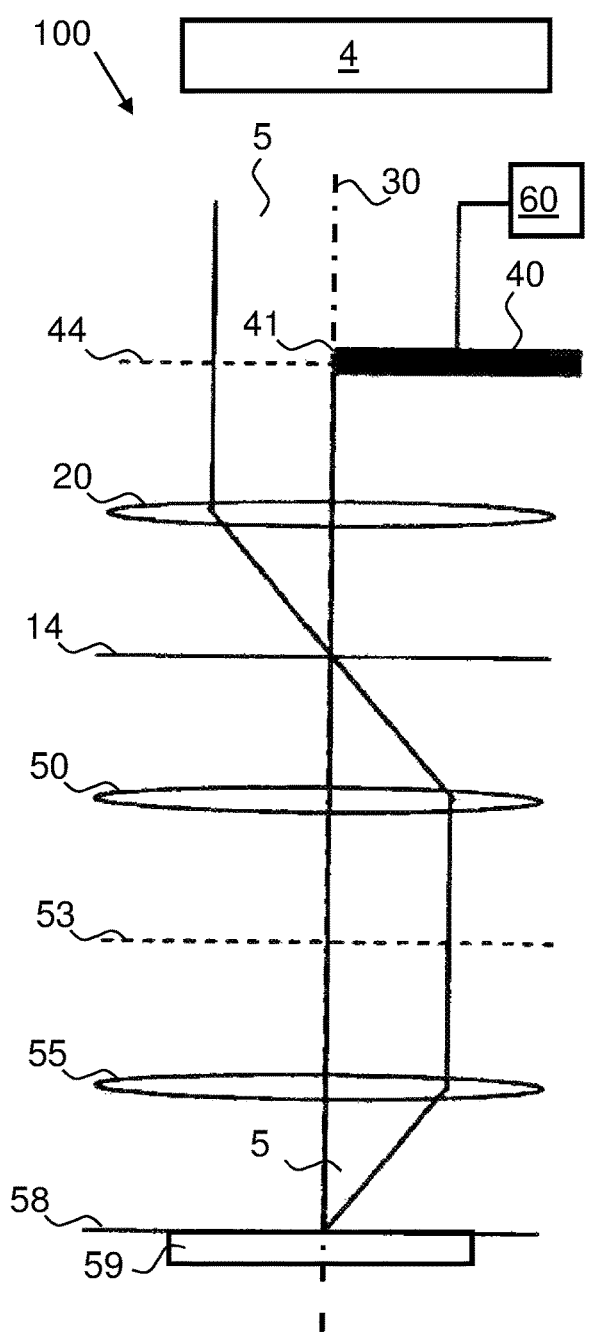 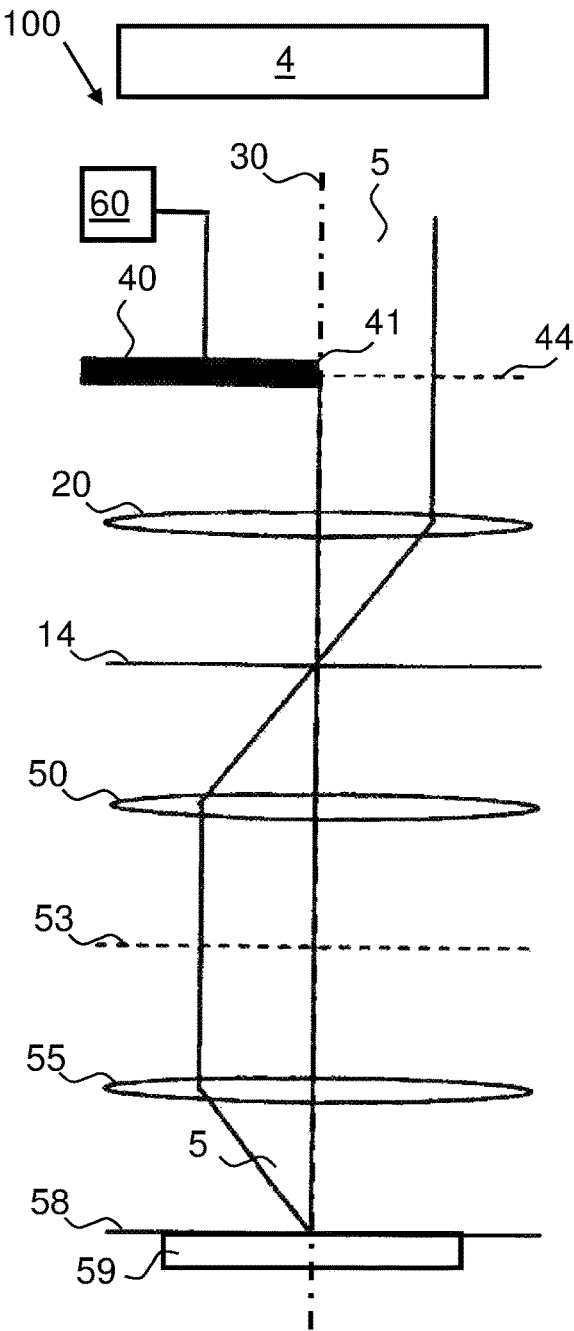
Fig. 1                    Fig. 2

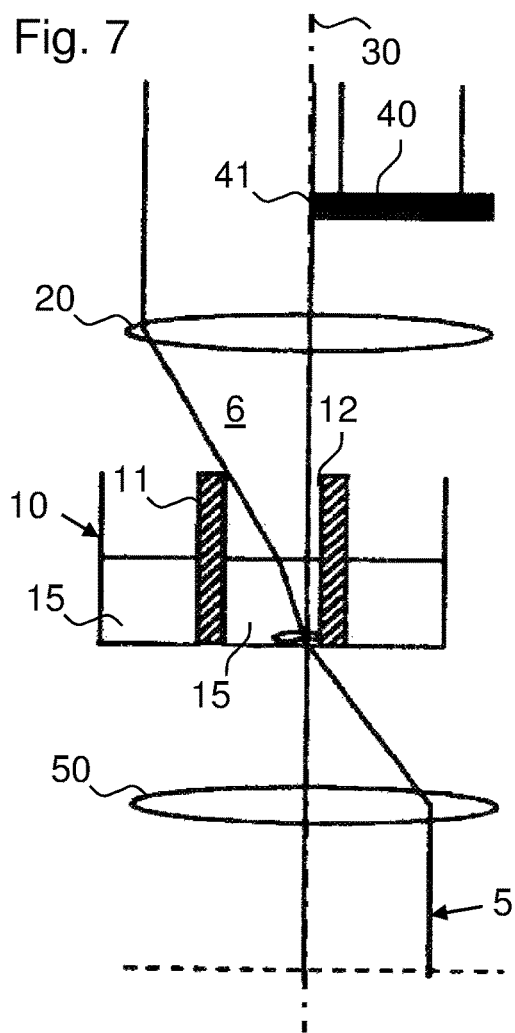
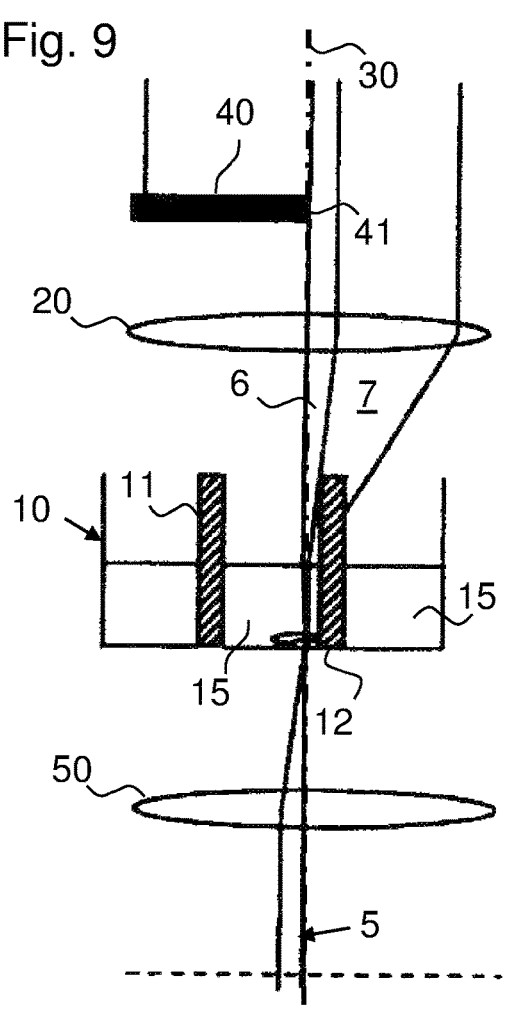
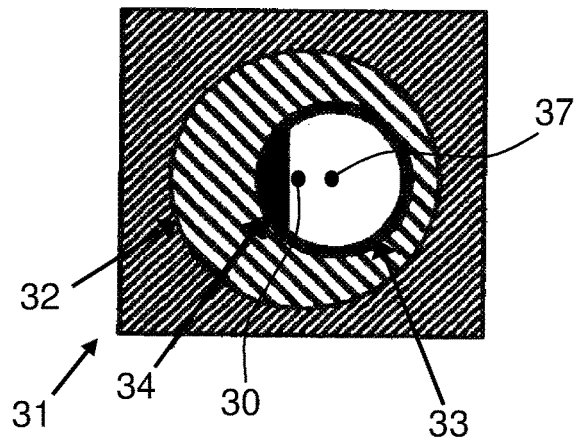
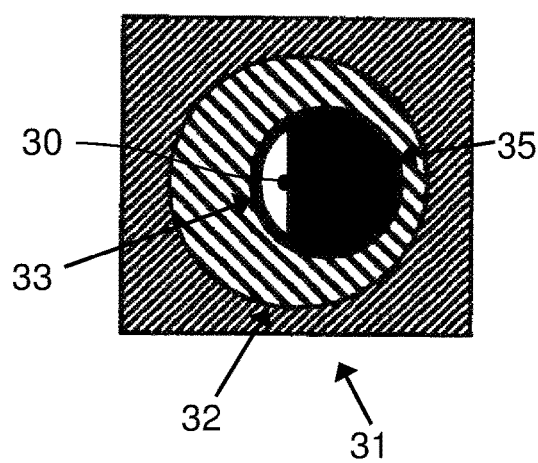

Fig. 20
Fig. 21
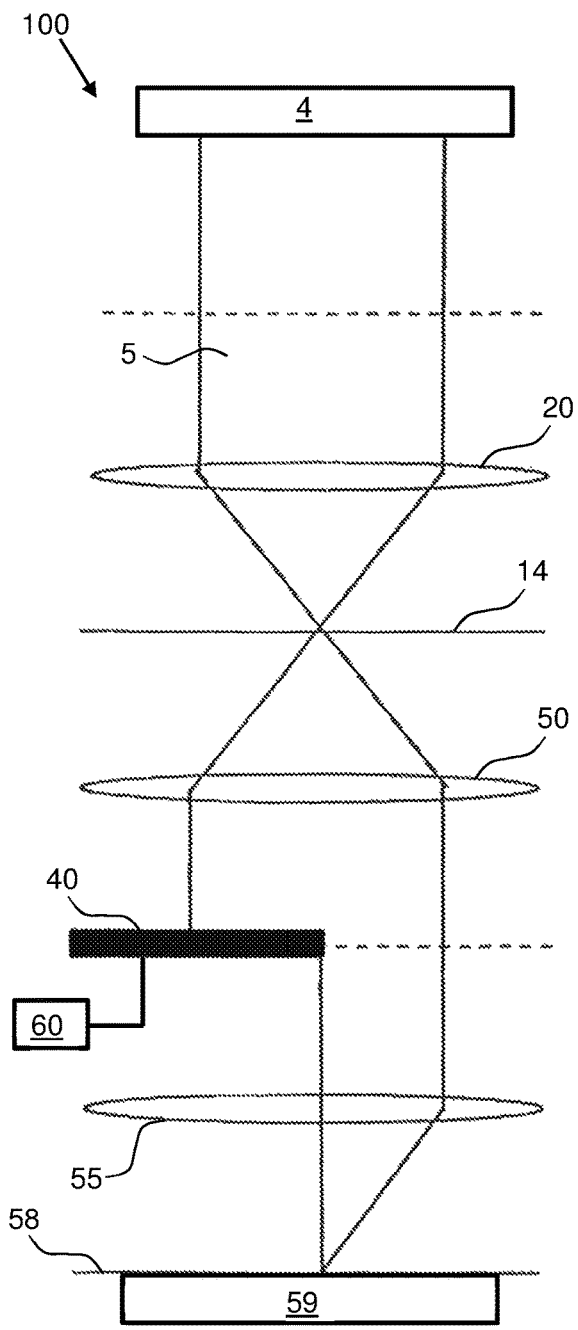
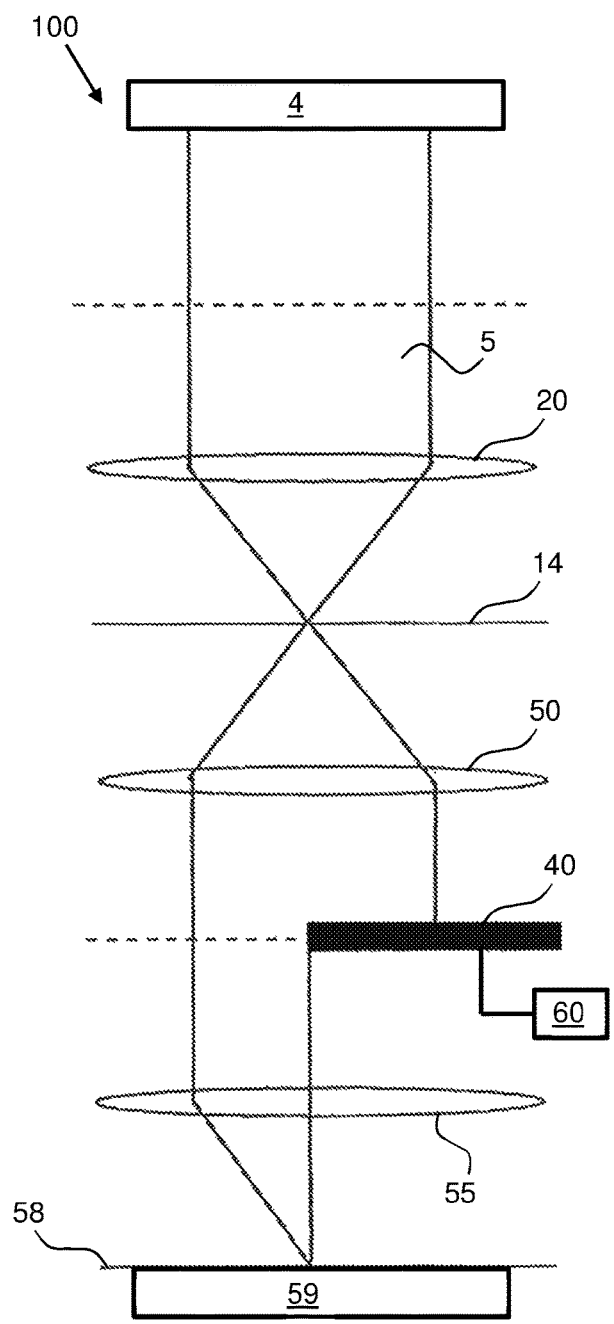

Fig. 22
Fig. 23
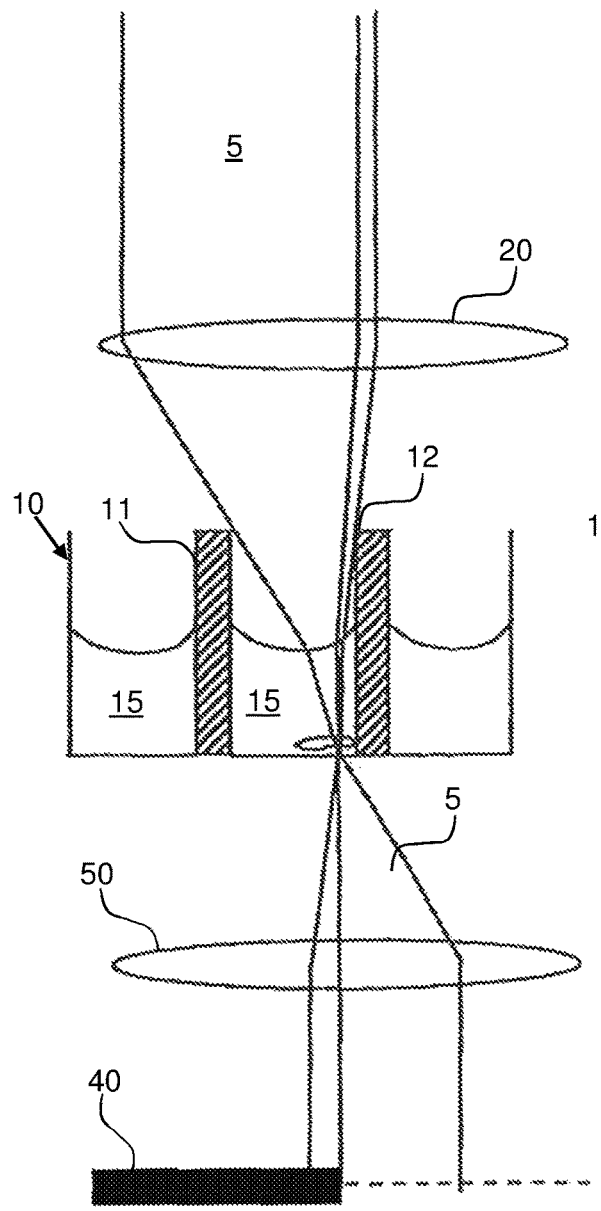
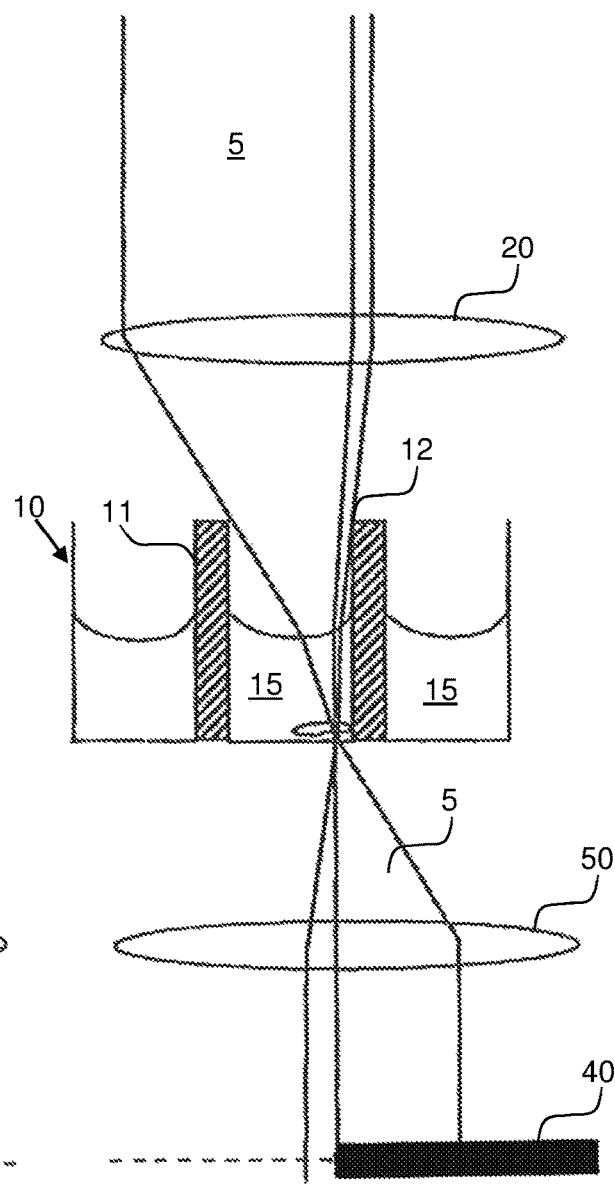

LIGHT MICROSCOPE AND METHOD FOR RECORDING IMAGES WITH A LIGHT MICROSCOPE

The present invention relates in a first aspect to a method for recording images with a light microscope.

In a second aspect the invention relates to a light microscope.

The method according to the invention and the light microscope according to the invention are suited in particular for the examination of specimens which changes the phase of light traversing the specimen.

If the specimen hardly influences the amplitude of the traversing light, a transmitted light-bright field image of the specimen has very low contrast. It is thus useful to make the phase information of the transmitted light visible. In the case of usual detectors, such as for example cameras or the human eye, only light intensities are measured but no phase information is measured. In order that the phase information can be registered with a usual light detector it is initially necessary for the phase change caused by the specimen to be converted into a change in the amplitude of the light.

Various methods are known for this purpose, for example the Zernike phase contrast method, the Hoffmann modulation contrast and the differential interference contrast (DIC) method. In all these methods, optical elements must be brought into the optical path between the specimen plane and the image plane in order to achieve the desired contrast. In the phase contrast method and in the Hoffmann modulation contrast method, a ring-form or bar-form diaphragm or other optical elements with a comparatively low degree of transmission are introduced into insert openings on the detection aperture. In the DIC method there is a birefringence prism between the specimen plane and the image plane, on which prism undesirable reflexions also compulsorily arise. In all known variants therefore the optical elements listed result in a loss of intensity.

Transmitted light images are indeed often recorded with a very high light intensity in such a way that the described intensity loss can be comparatively low. However, it can be desirable to also carry out fluorescence measurements on the specimen. Fluorescent light can be emitted by the specimen itself or by fluorescent dyes to be added. Only the fluorescing regions are recorded with a light detector, whereas the rest of the specimen remains invisible. It can thus be desirable to combine the fluorescent image with a transmitted light image, on which further outlines of the specimen are visible. The specimens can for example be cells, tissue sections or other biological specimens. Outlines of the cells and some inner structures, for example, can thus be illustrated with the transmitted light image, while the fluorescent image provides additional information. Fluorescent and transmitted light measurements can thus be carried out with the same light microscope. Since, however, the intensity of the fluorescent light emitted is often low, the previously described loss of intensity on optical elements leads to a marked impairment of the fluorescent image.

It is thus endeavoured to achieve a measurement method, in which no additional optical elements must be incorporated into the optical path either between the illuminating light source and the specimen or between the specimen and the image plane in order to convey a phase change of light into an amplitude change of the light. Such a method was proposed by Mehta and Sheppard and described in: Shalin B. Mehta and Colin J. R. Sheppard, "Quantitative phase-gradient imaging at high resolution with asymmetric illumination-based differential phase contrast", Optics Letters, vol. 34, No. 13 (2009), pp 1924-1926.

It is provided in this generic method for recording an image with a light microscope that a specimen container with a specimen is arranged on a specimen holder of the light microscope, illuminating light is guided onto the specimen, a diaphragm for cutting the illuminating light is brought into an optical path of the illuminating light, a first diaphragm setting is carried out, in which the diaphragm covers a first cross-sectional area portion of the illuminating light, a first image of the specimen is recorded with the first diaphragm setting, a second diaphragm setting is carried out, in which the diaphragm covers a second cross-sectional area portion of the illuminating light which differs from the first cross-sectional area portion, a second image of the specimen is recorded with the second diaphragm setting and the first image and the second image are set against each other to produce a contrast image.

A generic light microscope comprises: a specimen holder for holding a specimen container with a specimen, optical means for guiding illuminating light onto the specimen, a diaphragm which can be arranged in an optical path of the illuminating light in order to cut the illuminating light, electronic control means for adjusting the first diaphragm setting, in which the diaphragm covers a first cross-sectional area portion of the illuminating light, and image recording means for recording a first image of the specimen with the first diaphragm setting. The electronic control means are hereby adapted for adjustment of a second diaphragm setting, in which the diaphragm covers a second cross-sectional area portion of the illuminating light which differs from the first cross-sectional area portion, wherein a second image of the specimen with the second diaphragm setting can be recorded with the image recording means, and wherein the electronic control means are adapted to set the first image against the second image to produce a contrast image.

The diaphragm can be incorporated for example in the illuminating aperture, thus in a pupil plane, in which a light intensity distribution to a light intensity distribution in the specimen plane is determined by a Fourier transformation. In the recording of the first and second images the diaphragm can respectively cover a half of the illuminating aperture. The contrast image can be achieved for example through the formation of a difference between the brightness values of the image pixels of the first image and the brightness values of the image pixels of the second image. For standardisation it is additionally possible to carry out a division by the sum of the brightness values of the corresponding pixels in the first and second image. If a half pupil is respectively covered with the diaphragm in the first and second diaphragm setting, the contrast image corresponds to the phase gradient perpendicular to the direction of the boundary between the two half pupils.

This measurement method is particularly suited for specimens incorporated between an object carrier and a cover glass. Additional difficulties can arise if specimens, in particular cell cultures or other biological specimens, are examined in containers in the form of a small pot, for example in microtitre plates. Such microtitre plates comprise as specimen containers a plurality of specimen pots or so-called "wells" which are respectively separated from each other by a wall. A part of the illuminating light is blocked out through the wall of the specimen container. If the proportions of the illuminating light blocked out through the wall of the specimen container are different in the first and second diaphragm setting, this results in a poorer quality of the contrast image.

In the abovementioned article by Mehta and Sheppard the diaphragm is to be manually positioned in the optical path. If, however, specimen containers with side walls are used, the illuminating light is cut through the walls asymmetrically relative to the optical axis. Consequently the user scarcely has any clues concerning where to manually position the diaphragm. Manual adjustment of the diaphragm is thus inconvenient and time-consuming.

The present invention provides a method for recording an image with a light microscope, wherein a particularly good image quality is achieved as far as possible independently of the specimen container used. In addition a light microscope is to be created which allows the recording of an image with particularly good quality as far as possible independently of the specimen container used.

Advantageous variants of the light microscope according to the invention and embodiments of the method according to the invention are the subject matter of the dependent claims and are furthermore described in the following description, in particular in connection with the figures.

It is provided according to the invention in the method of the abovementioned type that, for a limited cross-sectional region of the illuminating light defined by a wall of the specimen container, by way of a first and second diaphragm setting those settings are determined and applied, in which the diaphragm covers equal sized portions of the limited cross-sectional region, wherein the illuminating light is cut in a cross-section transverse to an optical axis of the light microscope through the wall of the specimen container to the limited cross-sectional region.

In the light microscope of the abovementioned type according to the invention the electronic control means are adapted to determine and apply, for a limited cross-sectional region of the illuminating light defined by a wall of the specimen container, by way of a first and second diaphragm setting those settings, in which the diaphragm covers equal sized portions of the limited cross-sectional region, wherein a cutting of the illuminating light to the limited cross-sectional region can arise in a cross-section transverse to an optical axis of the light microscope through the wall of the specimen container.

It can be regarded as a core idea of the invention that the first and second diaphragm setting are adjusted in dependence upon the position of the limited cross-sectional region and thus in dependence upon the position of the specimen container relative to the optical axis. The fact that the diaphragm covers equal sized portions of the limited cross-sectional region in the first and the second diaphragm setting has an advantageous effect upon the quality of the contrast image which can be calculated via a difference formation between the first and the second image. The covered portions of the limited cross-sectional region can then be regarded as being of equal size if they differ from each other at most by 10%, preferably at most by 5% and particularly preferably at most by 2%.

The wall of the specimen container is to be understood to be the side boundaries of the specimen container extending approximately parallel to the optical axis. A bottom of the specimen container lying perpendicular to the optical axis is not on the other hand to be understood to be a wall of the specimen container.

The limited cross-sectional region of the illuminating light can be defined in a plane transverse, in particular perpendicular, to the optical axis. This cross-section can be defined along the optical axis at the position at which the diaphragm is located.

According to an embodiment the diaphragm is brought into the optical path between an illuminating light source and the specimen. By way of diaphragm positions for example an illuminating pupil, thus an aperture plane of a condenser or other optical means for focussing illuminating light on the specimen, can be used. Alternatively the diaphragm can also be arranged at a different position between an illuminating light source of the light microscope and the condenser, for example adjacent to the illuminating light source or to a diffusing plate adjacent to the illuminating light source.

Owing to a phase gradient in the specimen, different image brightnesses are produced at different positions of the diaphragm, although in these positions as far as possible equal sized portions of a cross-sectional region of the illuminating light are covered. This can be illustrated as follows: Through the diaphragm, which is arranged here in the optical path upstream of the specimen, illuminating light falls in an inclined manner onto the specimen. A phase gradient in the specimen influences the spatial progression of the illuminating light. If this progression is outwardly displaced a lower portion of the illuminating light is recorded by the objective. The image brightness thereby decreases. If on the other hand the illuminating light is guided inwards by the phase gradient, thus towards the optical axis, more illuminating light reaches the objective. The image brightness thereby increases. In dependence upon the phase gradient in the specimen, the brightness values thus differ in the two images recorded, for which the diaphragm covers equal sized but different regions.

In the case of this configuration, the illuminating aperture should be larger than or equal to the detection aperture. The illuminating aperture can be understood to be the numerical aperture, with which illuminating light is guided into the specimen plane. Correspondingly, the detection aperture can constitute the numerical aperture, with which illuminating light is received from the specimen plane with an objective.

If the illuminating aperture is at least as large as the detection aperture a phase gradient also actually causes, in the case of a displacement of the illuminating light outwards, a portion of the illuminating light to no longer be recorded by the objective. If on the other hand the illuminating aperture were smaller than the detection aperture, illuminating light would still be recorded completely by the objective if it is outwardly displaced due to the phase gradient. In this case the phase gradient would scarcely influence image brightness.

In principle the illuminating aperture can be determined by the condenser. Through a specimen container, however, the illuminating light can be cut, whereby the illuminating aperture is reduced. In the case of a microtitre plate with 96 wells, for example, the illuminating aperture can be reduced to $NA=0.3$. In the case of 384 wells the illuminating aperture can even be reduced to $NA=0.15$.

In case of specimen examinations the detection aperture is therefore frequently larger than the illuminating aperture. In these cases an adjustable additional diaphragm can also be provided in the objective pupil or a conjugate plane in the detection optical path. This limits the detection aperture so that it is smaller than or equal to the illuminating aperture. However, a considerable reduction in the demonstrable quantity of light is associated herewith.

This disadvantage is avoided with another embodiment. In this embodiment the diaphragm is brought into the optical path between the specimen and image recording means. A diaphragm which is arranged to produce an inclined illumination upstream of the specimen is not required here. The sign (+ or −) of the phase gradient in the specimen determines the direction in which illuminating light is displaced in the diaphragm plane. In dependence upon the phase gradient therefore a portion of the illuminating light will either still pass through the diaphragm or be blocked by it. The image brightness is thus also dependent here upon the phase gradient.

A large proportion of the light demonstrated is shown, however, independently of whether a displacement takes place in the specimen on the basis of a phase gradient. This portion can be extensively compensated by recording a further image with the second diaphragm setting, of which second image the brightness values are deducted from those of the first image. The resulting contrast image thereby contains only certain portions of light which is demonstrated independently of the phase gradient in both images. The brightness change caused by the phase gradient is on the other hand of a differing level in both images so that this difference becomes more applicable through the offsetting of the images. The value of the phase gradient is thereby significant in a direction perpendicular to a diaphragm edge of the diaphragm.

This method can also be used with objectives with a low numerical aperture. In this case an adjustable additional diaphragm can be provided in the optical path upstream of the specimen plane. This allows the illumination aperture to be reduced so that it is smaller than the detection aperture.

A particularly good image contrast can be achieved if a half of the limited cross-sectional region is covered with the first diaphragm setting and the other half of the limited cross-sectional region is covered with the second diaphragm setting. These settings can be carried out with a diaphragm which has precisely one linear diaphragm edge. The diaphragm edge can thereby be positioned so that it contacts the optical axis. The diaphragm can then be rotated from the first to the second diaphragm setting by 180° around the optical axis.

In order to fix the first and second diaphragm setting it is provided in a variant of the method according to the invention that a mid-point of the limited cross-sectional region of the illuminating light is determined, a straight line is fixed as a straight line of symmetry which extends through the mid-point and, by way of first and second diaphragm settings, those settings are applied, in which the area which is covered by the diaphragm in the first diaphragm setting and the area which is covered by the diaphragm in the second diaphragm setting lie symmetrical to the straight line of symmetry. In principle the straight line of symmetry can be any straight line which extends through the mid-point. In the case of diaphragms which include switchable liquid crystal regions, it is possible for example for any straight line running through the mid-point to be selected.

However, the diaphragm settings can also differ from each other in a rotation angle of a diaphragm edge of the diaphragm around a rotation axis. In this case a straight line is preferably fixed as a straight line of symmetry which cuts the mid-point and the rotation axis.

In particular if the rotation axis lies on or in the proximity of the optical axis, a straight line of symmetry can be fixed which extends through the mid-point of the limited cross-sectional region and through the optical axis. Insofar as in this variant the straight line of symmetry still cuts the optical axis, the diaphragm can contact the optical axis with a diaphragm edge in the first and the second diaphragm setting. It is hereby advantageously possible for a movement of the diaphragm from the first to the second diaphragm position to take place, independently of the respective position of the limited cross-sectional region, by rotating the diaphragm around the optical axis.

In dependence upon an adjustment of the diaphragm, however, a rotation axis can be spaced apart from the optical axis. Optical components in the optical path can also influence the position of the optical axis.

According to a method variant therefore a position of the rotation axis is thus determined in a calibration measurement. The position determined can then be used to determine suitable rotation angles of the diaphragm which can be used for the different diaphragm settings.

The position of the optical axis can also change unintentionally through switchable components in the optical path. For example an objective change often leads to a displacement of the optical axis. A calibration measurement is thus carried out after each change of the objective.

For the calibration measurement, for example, at least one pupil image can be recorded and evaluated. In the pupil image the diaphragm which is arranged in a pupil plane is sharply imaged.

At least two pupil images are preferably recorded in the calibration measurement, in which the diaphragm edge is brought into various rotation angles around the rotation axis. The position of the rotation axis is then determined from the orientations of the diaphragm edge in the different pupil images.

In the case of a determination of the diaphragm settings via the mid-point of the limited cross-sectional region, a good quality of the contrast image can be achieved for any wall forms of the specimen container, in particular for specimen containers with a circular or rectangular cross-section.

An alternative for determination of the diaphragm settings via the mid-point of the limited cross-sectional region is provided in a further embodiment of the method according to the invention. A connecting straight line from the optical axis to a closest lying wall region of the specimen container is hereby determined as a straight line of symmetry, whereby the closest lying wall region is that part of the wall of the specimen container which is located closest to the optical axis. In addition, by way of first and second diaphragm settings, those settings are applied, in which the area which is covered by the diaphragm in the first diaphragm setting and the area which is covered by the diaphragm in the second diaphragm setting lie symmetrically to the straight line of symmetry.

Approximately the mid-point of the respective image can be assumed as the position of the optical axis in images recorded. The symmetry in relation to the straight line of symmetry is to be understood as being in a mirror image to the straight line of symmetry. In the case of a diaphragm with a linear diaphragm edge which in particular contacts the optical axis, the first and second diaphragm positions are accordingly rotated by 180° relative to each other. The linear diaphragm edge hereby preferably lies in this case precisely on the straight line of symmetry. If on the other hand the diaphragm is in the form of a circle segment or piece of cake, of which the tip forms an angle α on the rotation axis or the optical axis, it follows from the axis symmetry in relation to the straight line of symmetry that the first and second diaphragm positions are rotated relative to each other by an angle differing from 180°.

This embodiment is suited in particular for specimen containers with a round or circle-shaped wall in a cross-section transverse to the optical axis. In such a round specimen container, through the straight connecting line from the optical axis to the closest lying wall region, the cross-sectional region of the illuminating light which is limited by the specimen container is exactly halved.

The determination of the closest lying wall region or the mid-point of the limited cross-sectional region takes place in a method variant by means of an overview measurement. It is hereby provided that in an overview measurement an overview image of the specimen is recorded, that in the overview image the position of a wall of the specimen container is determined by means of image processing means and that the closest lying wall region to the optical axis is determined from the determined position of the wall and/or that with the determined position of the wall the mid-point of the limited cross-sectional region is determined.

In order that a measurement can be carried out with as much illuminating light as possible, in the overview measurement the diaphragm is preferably not in the optical path of the illuminating light. In principle, however, the diaphragm can also be in the optical path. The overview measurement can take place with a smaller magnification than the measurements for recording the first and the second image, with which the contrast image is created. In particular the magnification in the overview measurement can be small enough so that a wall region of the specimen container is always recorded. A wall region is thus constantly recorded in spite of differing relative position of the specimen container so long as the optical axis extends through the specimen container. Alternatively the overview measurement can also be recorded with the same resolution as the first and the second image.

In a further embodiment of the method according to the invention it is provided that in order to determine the first and second diaphragm setting in an overview measurement an overview image of the specimen is recorded, the position of a wall of the specimen container is determined in the overview image by means of image processing means and the closest lying wall region to the mid-point of the overview image is determined from the determined position of the wall, a perpendicular to a tangential plane of the closest lying wall region is determined and the perpendicular is fixed as a straight line of symmetry. By way of first and second diaphragm settings, those settings are hereby applied, in which the area covered by the diaphragm in the first diaphragm setting and the area covered by the diaphragm in the second diaphragm setting lie symmetrical to the straight line of symmetry. If the specimen container has a circle-shaped cross-section, the limited cross-sectional region defined by the wall of the specimen container is constantly halved with the straight line of symmetry. Insofar as the two diaphragm settings are fixed in a mirror image to each other relative to the straight line of symmetry, the diaphragm advantageously covers in both diaphragm settings equal sized portions of the limited cross-sectional region.

A variant of the method according to the invention modified in relation to the above-described embodiment considers the fact that generally the wall of the specimen container projects out of the specimen plane. As a consequence the wall is not sharply imaged in the image plane of the light microscope, but instead acts there as a shadow on the image of the specimen. Conclusions can be drawn concerning the position of the wall from the position of the shadow. This method variant is characterised in that, for the determination of the first and second diaphragm setting, an image of the specimen is recorded, wherein the diaphragm is not in the optical path of the illuminating light, that a region shadowed by the wall of the specimen container is recognised in the image by means of image processing means and the wall is identified as a separating line between the shadowed region and a non-shadowed region of the image. When fixing the separating line, previously learned values can also be used, in which the position of a shadowed region has been associated with a wall position determined in an overview measurement.

In principle the region covered by the diaphragm in the first diaphragm setting can overlap with the region which is covered by the diaphragm in the second diaphragm setting. For a high image contrast, however, it is useful for the covered regions not to overlap or to hardly overlap. According to a further variant of the method according to the invention, in this connection, by way of first and second diaphragm settings, those settings are applied, in which an area covered by the diaphragm is as far as possible adjacent to the straight line of symmetry.

In the variants described, a determination of the two diaphragm settings can be carried out in that at least a test image, preferably without a specimen, is recorded and a position of the wall of the specimen container is determined in the test image with image processing means.

Alternatively, both the desired diaphragm settings can also be determined by recording a series of test images with different diaphragm settings and then selecting two suitable ones from the diaphragm settings using an evaluation criterion. It is hereby provided that in order to determine the first and second diaphragm setting the diaphragm is firstly brought into the optical path of the illuminating light, in particular so far that a diaphragm edge of the diaphragm contacts the optical axis. The diaphragm is then rotated, in particular around the optical axis. At different rotation positions of the diaphragm, test images of the specimen are recorded. A respective pair of test images, in relation to which the associated rotation positions of the diaphragm are rotated by 180° relative to each other, are offset against each other in relation to an evaluation criterion. One of the pair of test images is selected with the evaluation criterion and the associated two diaphragm settings are set as first and second diaphragm settings.

This rotation offset of 180° between the first and second diaphragm position applies for a diaphragm which has precisely one linear diaphragm edge which extends completely through the cross-section of the illuminating light. In the case of a diaphragm which leaves free merely a circle segment with the angle a on the optical axis, the rotation offset between the two diaphragm positions is not 180° but instead angle a.

For the evaluation criterion, a contrast image can firstly be calculated from the pair of test images, for example through the formation of a difference in the brightnesses of corresponding image points of the test images and subsequent division by the sum of the brightnesses of the corresponding image points. For each of the thus determined contrast images, a contrast can then be calculated and/or a count of the edges can be carried out. The more details that are visible on the contrast image, the higher are generally the contrast and edge number. Finally the pair of the test images, of which the contrast and/or edge number is/are the greatest is selected as an evaluation criterion.

In order to reduce the time required to determine the first and second diaphragm setting the test images can be recorded with a lower exposure time than the first and the second image, with which the contrast image is produced.

Furthermore the necessary time can be reduced if the determination of the two diaphragm settings takes place iteratively. In this case firstly the row of test images is carried out with diaphragm settings which lie at a comparatively great angle of rotation relative to each other, for example 30°. The two most suited pairs of diaphragm settings are selected therefrom with the evaluation criterion. Rotation positions between these two pairs are then set in smaller rotation angles, for example at a 5° distance and, using test images recorded in this respect, the most suited pair of diaphragm settings are set as first and second diaphragm settings with the evaluation criterion.

In a further alternative the two diaphragm settings can also be learnt. In this connection, positioning means can be present for the specimen holder. In a learning process, electronic control means set different positions of the specimen holder and a specimen container held by it via the positioning means. There is no specimen in the specimen container or at least no specimen producing a phase contrast. An image is recorded for each position of the specimen container and a wall of the specimen container is determined automatically or by a user. A perpendicular to a tangential plane to the determined wall is then fixed as the straight line of symmetry. The learning process is concluded when a straight line of symmetry is stored for each desired position. In the measurement operation the stored straight line of symmetry can be used, for a set position of the specimen container, to carry out two diaphragm settings which lie symmetrical to the straight line of symmetry. It can also be provided that, instead of a straight line of symmetry in the learning process, two diaphragm settings for the respective position of the specimen holder and the specimen container held by it can be directly stored and loaded in the measurement operation.

According to a further method alternative a mechanical diaphragm with at least one diaphragm edge is used as a diaphragm. In order to adjust the first and the second diaphragm setting it can be provided that the diaphragm is brought into the optical path of the illuminating light, in particular so far that its diaphragm edge contacts the optical axis and that the diaphragm is rotated from the first diaphragm setting to the second diaphragm setting, in particular around the optical axis. A motorised control of the diaphragm can hereby be advantageously designed particularly simply, as merely a rotation of the diaphragm is necessary to switch between the two diaphragm settings.

It can also be provided according to the invention that the diaphragm is rotated continuously, that for a first image recording a camera sensor of the light microscope is exposed via multiple rotations of the diaphragm, that for a first image recording a light pulse is sent as illuminating light whenever the diaphragm is at a first rotation position as a first diaphragm setting and otherwise no illuminating light is emitted. For a second image recording the camera sensor of the light microscope is exposed via multiple rotations of the diaphragm, whereby for the second image recording a light pulse is sent as illuminating light whenever the diaphragm is at a second rotation position as a second diaphragm setting and otherwise no illuminating light is emitted. A stroboscopic illumination is thus produced. For the recording of the first image it can be provided that so many light pulses are sent until a predefined image brightness is ascertained with the camera sensor. The second image is then recorded with the same number of light pulses. For a particularly good signal to noise ratio, the second image can also be recorded with so many light pulses until a predefined image brightness is achieved, whereby for the subsequent offset of the first and the second image the different numbers of emitted light pulses is taken into consideration.

Instead of the stroboscopic illumination, a longer illumination time can also be provided, during which illuminating light is continuously emitted and the diaphragm rotates. This method variant may be preferred if the diaphragm has a circle segment form, wherein a circle segment opening of the diaphragm with a tip is arranged so that it contacts the optical axis of the light microscope.

It is provided in this variant that the diaphragm is continuously rotated, that by way of a first diaphragm setting the diaphragm extends over a first rotation region and by way of a second diaphragm setting the diaphragm extends over a second rotation region. Here, the first and second diaphragm settings do not constitute fixed positions but instead a movement of the diaphragm. The portions of the limited cross-sectional region which are covered in the first or second diaphragm setting are here the portions covered when the diaphragm extends over the first or second rotation region. Preferably the circle segment opening can have an angle of less than 180°. In order that a comparatively large quantity of light can reach the camera sensor, however, the circle segment opening can also have an opening angle of greater than 180°.

In order to ensure that, when recording the first and second image, as far as possible opposing regions of the limited cross-sectional region are covered, the first rotation region and the second rotation region can respectively be defined as a rotation angle of 180° around the optical axis. In order to hereby take into account the extension of the diaphragm, the rotation angle of 180° can also be reduced by the angle of the circle segment opening. A good contrast can furthermore be achieved if a diaphragm position is fixed as the beginning and/or end of the two rotation regions, at which diaphragm position a diaphragm edge contacts the straight line of symmetry connecting the optical axis and the closest lying wall region of the specimen container.

For a good image quality, a suitable exposure time of the image recording means of the light microscope is significant. The image recording means can for example be a camera chip or sensor with spatial resolution. According to a variant of the method according to the invention it is provided that a test image is recorded with the first and/or second diaphragm setting, an image brightness of the recorded test image or the recorded test images is determined, with the determined image brightness an exposure time of a camera chip of the light microscope is fixed so that a desired image brightness is achieved with the first and/or second diaphragm setting, and that the rotation speed of the diaphragm is selected so that the time required by the diaphragm to extend over the first and second rotation region is respectively equal to the fixed exposure time. Here, the rotation speed of the diaphragm is thus adapted to a previously determined exposure time of the camera chip.

Alternatively or additionally, the light intensity of an illuminating light source of the light microscope can be changed in order to set a desired image brightness. In this case a respective image is recorded with the first and/or second diaphragm setting and an image brightness of the recorded images is determined. In dependence upon this image brightness the light intensity is adjusted so that the desired image brightness is achieved with the first and/or second diaphragm setting. Then, the first and the second image are recorded with the two diaphragm settings to produce the contrast image.

The light microscope according to the invention can be adapted in particular to carry out the method according to the invention and the described method variants.

In the case of the light microscope according to the invention a contrast image is produced by adjusting a diaphragm in the illuminating optical path, thus a diaphragm between the illuminating light source and the specimen plane. In order to ensure that light losses are as low as possible it can be provided that the light microscope is free of optical elements between the specimen holder and the image recording means for phase contrast generation. In particular it can be provided that no double refraction prisms and no polarisation filters are hereby present for phase contrast generation.

Alternatively the diaphragm can be arranged between the specimen plane and image recording means. For example the diaphragm can be arranged in the optical path downstream of the objective in a plane which is optically conjugated with a pupil plane of the objective. In these cases, it is preferable for no diaphragms to be present between the illuminating light source and the specimen plane.

The light microscope can usefully comprise an objective for guiding illuminating light coming from the specimen to the image recording means. The diaphragm is hereby preferably arranged in a plane which is conjugated with an aperture plane of the objective. The diaphragm is thus preferably arranged in a pupil plane, in which an illuminating light intensity is correlated via a Fourier transformation with the illumination intensity in the specimen plane.

The optical means for guiding the illuminating light onto the specimen can comprise a condenser. In the case of arrangement in the illuminating optical path the diaphragm is preferably arranged on a side of the condenser facing away from the specimen holder, in particular in an aperture plane of the condenser. Alternatively, the diaphragm can be arranged beside an illuminating light source of the light microscope or beside a diffusing plate of the illuminating light source. With these arrangements of the diaphragm, it can advantageously be ensured that a brightness difference caused by the specimen is particularly great between the first and second image.

In order to adjust the diaphragm, a diaphragm motor is preferably present. The electronic control means are then adapted to move the diaphragm by means of the diaphragm motor from the first diaphragm setting to the second diaphragm setting. In particular the diaphragm can be rotated. Its rotation axis can lie in the optical axis or differ from this. The electronic control means can also be adapted to move the diaphragm into the illuminating optical path as far as the first diaphragm setting.

According to a further embodiment of the light microscope according to the invention the diaphragm is formed with two parts with a first and a second diaphragm blade. The two diaphragm blades can be rotated together around the optical axis and be moved independently of each other in the radial direction to the optical axis. The electronic control means can be adapted, for setting of the first diaphragm setting, to move the first diaphragm blade into the optical path of the illuminating light and to move the second diaphragm blade out of the optical path. For adjustment of the second diaphragm setting, the second diaphragm blade is moved into the optical path of the illuminating light and the first diaphragm blade is moved out of the optical path.

The diaphragm can also be configured as a diaphragm group with a plurality of individual diaphragms. A different single diaphragm can be brought into the optical path for the different diaphragm settings. In the case of a mechanically robust design the single diaphragms of the diaphragm group are rigidly connected to each other. For example the diaphragm group can be designed as a wheel with recesses arranged annularly around it. The single diaphragms are received in the recesses. By rotating the diaphragm group a desired single diaphragm can then be brought into the optical path.

Each single diaphragm can comprise a diaphragm edge. The single diaphragms are arranged within the rigid diaphragm group so that their diaphragm edges are orientated at different angles or rotation angles if the respective single diaphragm is located in the optical path of the illuminating light.

The diaphragm group can also comprise one or more free passages, at which there are no single diaphragms. One or a plurality of the recesses are not therefore covered with single diaphragms. The optical path is not cut by such a passage and this can be advantageous for example for fluorescence measurements. In addition in this embodiment, a single motor for rotating the diaphragm group is sufficient in order to carry out the desired diaphragm settings and a setting without a diaphragm for fluorescence measurements.

If on the other hand for example a single diaphragm with precisely one diaphragm blade is used, two motors are preferably present. The diaphragm can be moved into and out of the optical path with the first motor. The diaphragm can be rotated with the second motor to carry out different diaphragm settings. In this connection the diaphragm can be mounted in particular so that it can be rotated in an annular receiving area.

The diaphragm can also be impermeable to light in the spectral range of the illuminating light and permeable to light in a differing spectral range. The diaphragm can thereby be formed as a colour filter or dichroic. It can advantageously thereby be ensured that fluorescent light can also pass the region covered by the diaphragm. It is not therefore necessary, for fluorescence measurements, to remove the diaphragm from the optical path. It is preferable if the diaphragm blocks light in a wavelength range, in which typically no fluorescent light is emitted anyway. This relates in particular to infrared light and/or light in the deep red spectral range.

A wavelength-dependent ray splitter can be present in the optical path downstream of the diaphragm in order to ensure time-saving image recording. The ray splitter guides illuminating light to one camera and fluorescent light to another camera.

A recorded fluorescent image can also be superimposed to an image with the contrast image calculated from the two images with different diaphragm settings. It is not thereby necessary for different images of the same specimen region to be separately observed or evaluated.

In the aforementioned configuration, in which the diaphragm is light permeable in the spectral range of fluorescent light, the recording of the fluorescent image can take place independently of the momentary diaphragm setting.

If on the other hand a diaphragm is used which also blocks fluorescent light, the diaphragm is removed from the optical path before a fluorescent image is recorded. The recording of the fluorescent image can take place between the recording of the two images with different diaphragm settings. The time duration for recording the fluorescent image can thus be used in order to carry out a rotation movement of the diaphragm before it is moved back into the optical path for the second image recording.

Instead of a mechanical diaphragm or in addition to a mechanical diaphragm, the diaphragm can also comprise a two-dimensional array of liquid crystal elements which can be switched between transparency and opacity. Here, the electronic control means are adapted, for the adjustment of the first and the second diaphragm setting, to respectively switch certain liquid crystal elements to opacity. A movement of the diaphragm is advantageously not necessary here and an image recording can take place in a particularly short time. The region covered by the diaphragm is determined here by the liquid crystal elements which are switched to opacity. The liquid crystal elements can be arranged in a rectangular shaped matrix, with which any desired diaphragm shape can be approximated. Alternatively, the liquid crystal elements can have the form of circle segments, the mid-point of which coincides with the optical axis of the light microscope. Images with a high contrast can hereby already be achieved with a relatively low number of liquid crystal elements. It can also be provided that an inner region of the diaphragm is formed via an array of liquid crystal elements, while an external region of the diaphragm is produced through a mechanical circular diaphragm.

According to a further embodiment the diaphragm comprises a plurality of mirrors which can be switched between at least two different orientations. Illuminating light is forwarded in the direction of the image recording means in only one of the orientations. The mirrors can be adjusted independently of each other so that any diaphragm form can be set with them. In particular the diaphragm can be configured as a micro mirror array (DMD: digital mirror device).

In principle it suffices to determine two diaphragm settings, in which the light-blocking regions of the diaphragm lie symmetrical to the above-described straight line of symmetry. Two images can thus be recorded which are offset to form a contrast image. A brightness contrast therein depends significantly upon the phase gradient in the specimen in a certain direction. In order to also produce contrast images, wherein the brightness contrast depends significantly upon the phase gradient in another direction, further images can also be recorded for diaphragm settings which lie symmetrical to a different straight line of symmetry. Preferably, two straight lines of symmetry are selected which are perpendicular to each other and both extend through the mid-point of the limited cross-sectional region. The at least two contrast images produced in this way can finally also be offset or superimposed to form a single image.

For a high image resolution the illuminating aperture is to be as large as possible. This means that the objective is to forward light leaving a specimen point with as large as possible opening angle, whereby this opening angle is to be illuminated as far as possible with the illuminating light. This can be achieved according to the invention in particular if a respective half pupil is covered in the first and the second diaphragm setting, thus a half of the cross-sectional region limited by the wall of the specimen container. An image with good contrast can, however, also be achieved if, instead of half pupils, smaller circle segments are left through the diaphragm. It is thereby necessary for the two circle segments left free in the first and the second diaphragm setting to lie opposite in the aperture diaphragm plane, that is to say axis symmetrically to the above-described straight line of symmetry.

A diaphragm, of which the circle segment left free forms an angle greater than 180°, can also be used according to the invention. Advantageously, illuminating light is hereby guided to the image recording means, with which shorter exposure times are possible. Here, the two images to be offset contain, however, the same portions which lead to a contrast increase of the calculated contrast image.

In principle, any diaphragm shapes, for example rings or half rings, are possible. It is hereby important that the regions covered in the first and second diaphragm setting lie symmetrical to the abovementioned straight line of symmetry.

The light microscope according to the invention is suited, in contrast with conventional generic light microscopes, in particular to also examine specimen regions close to the walls of the specimen container. In the case of a configuration of the light microscope according to the invention, different regions of the specimen are automatically scanned one after the other. In this connection it is provided that positioning means are present to displace the specimen holder, the electronic control means are adapted, for the examination of different regions of the specimen in the specimen container, to set different positions of the position holder by means of the positioning means, and the electronic control means are adapted to determine a first and a second diaphragm setting for each set position of the specimen holder and to produce a contrast image for each set position of the specimen holder.

The contrast images obtained in this way for the different regions of the specimen can subsequently be put together to form an overall image. The specimen holder which is displaced can also be formed on a specimen table, wherein the positioning means can be adapted to adjust the specimen table and thus the specimen holder.

Further features and advantages of the invention are described below by reference to the attached schematic figures.

FIG. 1 shows a schematic illustration of an embodiment of a light microscope according to the invention, in which a first image setting has been carried out.

FIG. 2 shows a schematic illustration of the light microscope according to the invention of FIG. 1, wherein a second diaphragm setting has been carried out.

FIG. 7 shows a schematic illustration of components of a light microscope, wherein the illuminating light is cut asymmetrically by the specimen container and a diaphragm is brought into a first diaphragm setting.

FIG. 8 shows a schematic illustration of a cross-section of the illuminating light for the situation of FIG. 7.

FIG. 9 shows a schematic illustration of components of a light microscope, wherein the illuminating light is asymmetrically cut by the specimen container and a diaphragm is guided into a second diaphragm setting.

FIG. 10 shows a schematic illustration of a cross-section of the illuminating light for the situation of FIG. 9.

Figure 15:
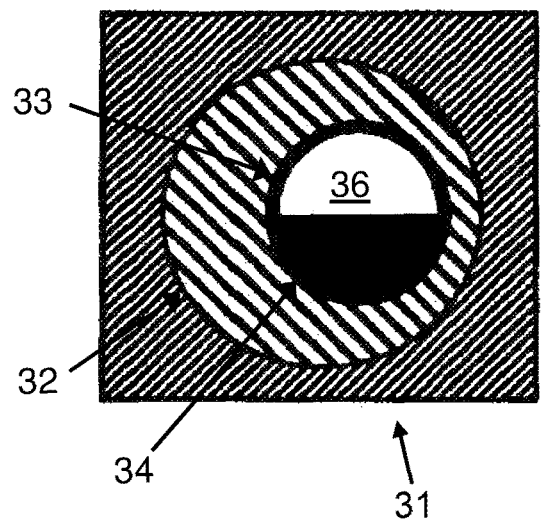
Figure 16:
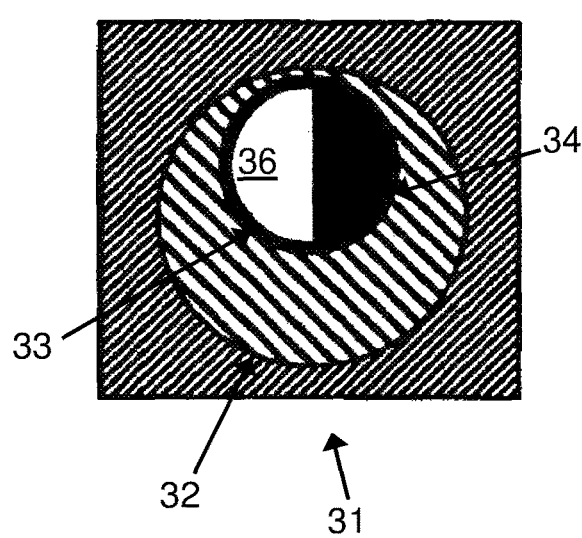

FIGS. 15 and 16 respectively show a schematic illustration of a cross-section of illuminating light which is cut by a diaphragm arranged according to the inventive method.

Figure 17:
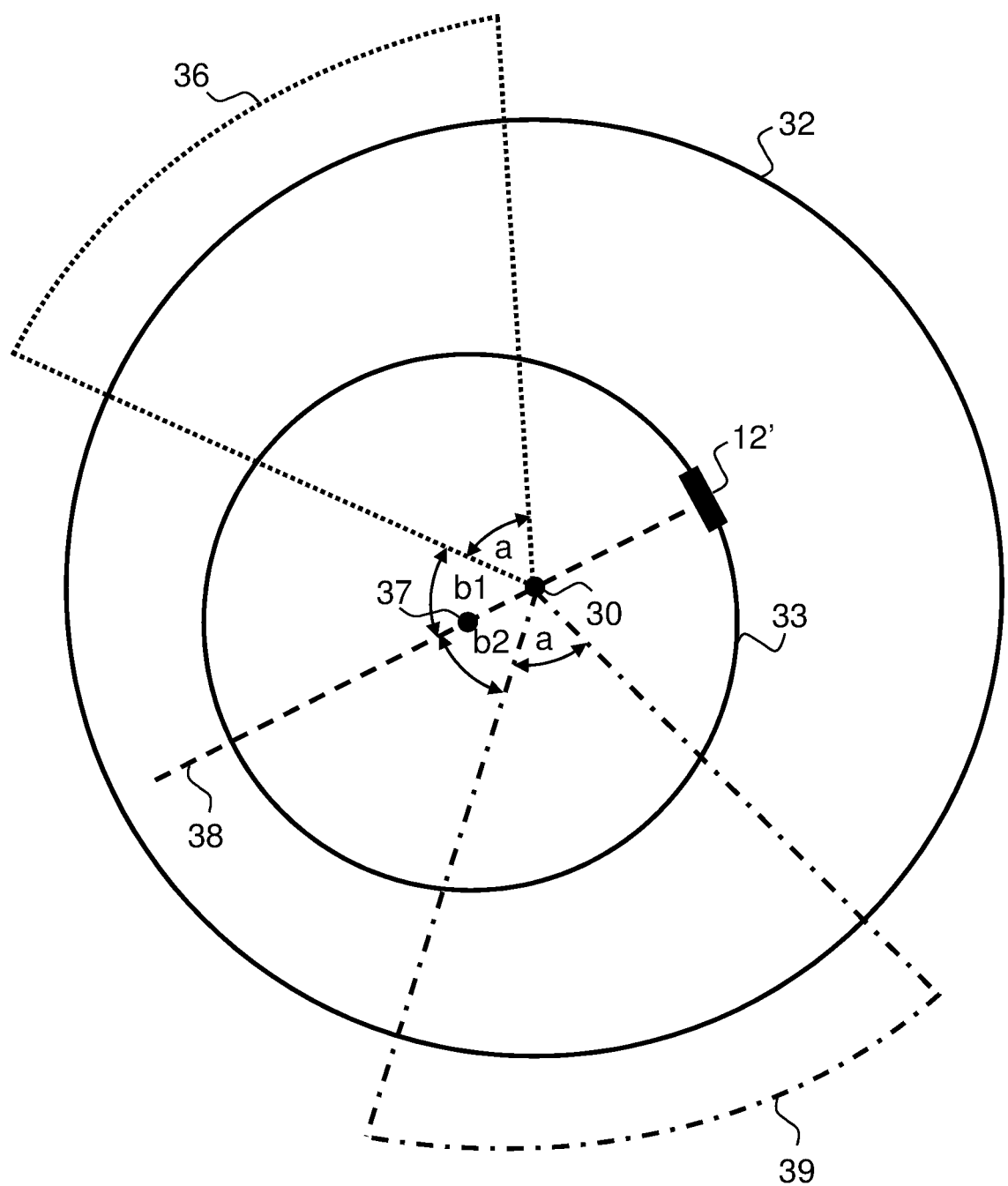

FIG. 17 shows a further schematic illustration of a cross-section of the illuminating light to clarify the determination of the first and second diaphragm setting.

Figure 18:
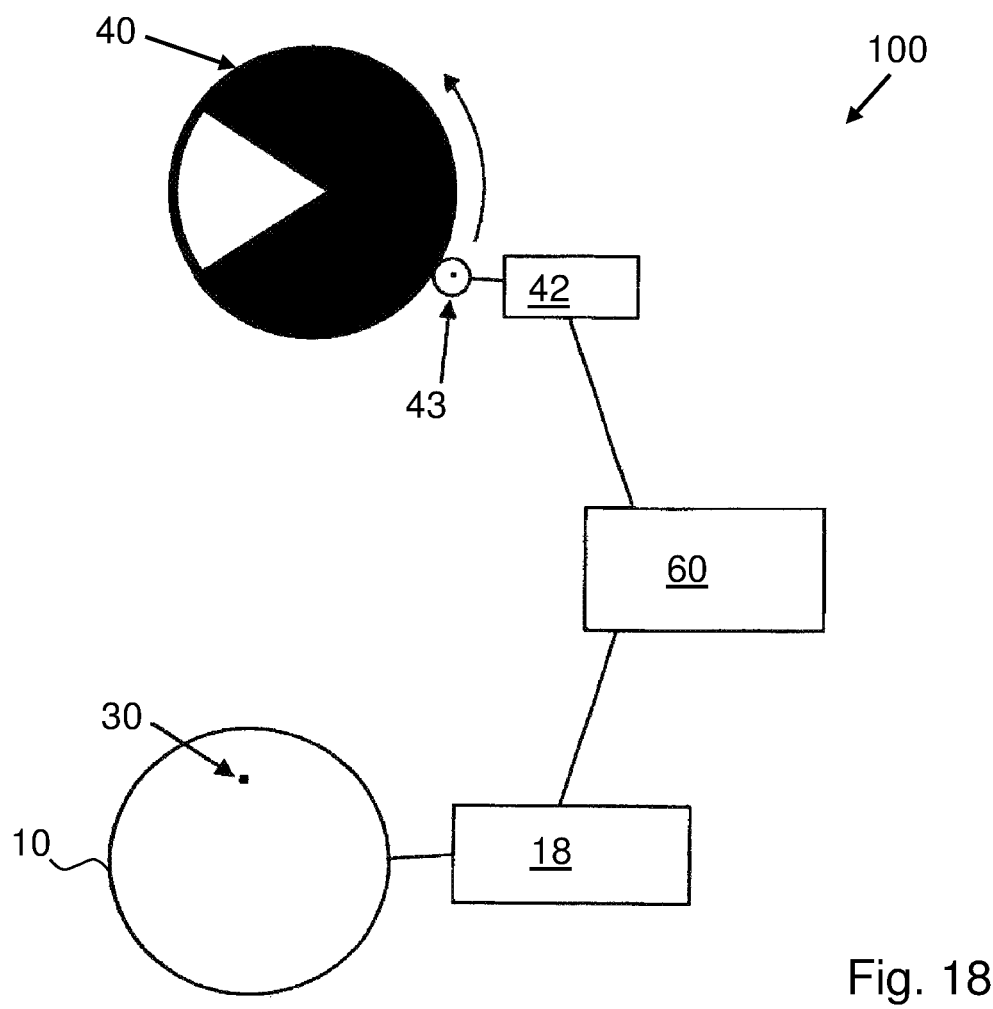

FIG. 18 shows a schematic illustration of a further embodiment of a light microscope according to the invention, wherein a circle segment shaped diaphragm is used.

Figure 19:
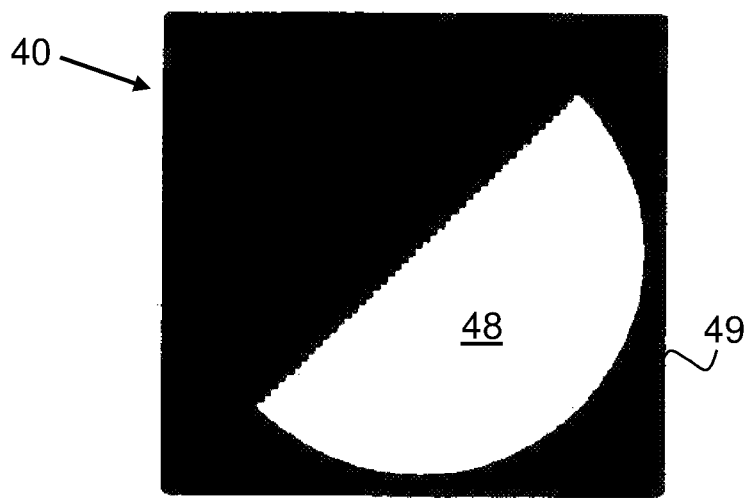

FIG. 19 shows a schematic illustration of a diaphragm of a light microscope according to the invention which is formed with liquid crystal elements.

FIG. 20 shows a schematic illustration of an embodiment of a light microscope according to the invention, wherein the diaphragm is in the detection optical path in a first diaphragm setting.

FIG. 21 shows a schematic illustration of the light microscope according to the invention of FIG. 20, wherein a second diaphragm setting is carried out.

FIG. 22 shows a schematic illustration of components of a light microscope, wherein the illuminating light is asymmetrically cut through the specimen container and a diaphragm is located in a determined diaphragm setting.

FIG. 23 shows a schematic illustration of the parts of a light microscope of FIG. 22, wherein the diaphragm is in a different diaphragm setting.

Figure 24:
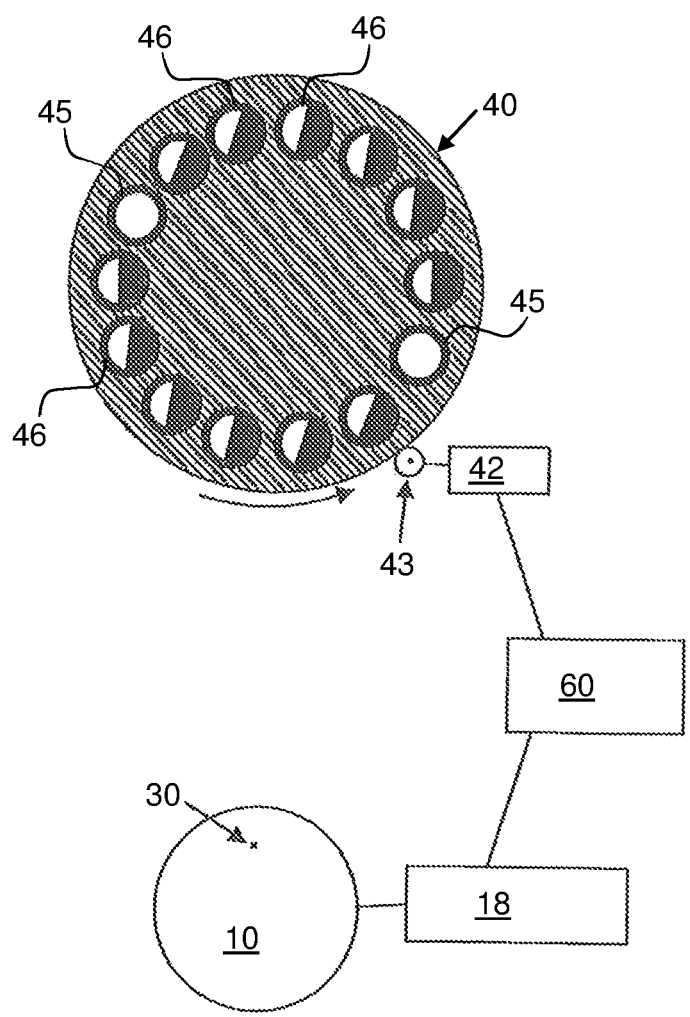

FIG. 24 shows a schematic illustration of a further embodiment of a light microscope according to the invention, wherein the diaphragm is configured as a group of diaphragms.

Figure 25:
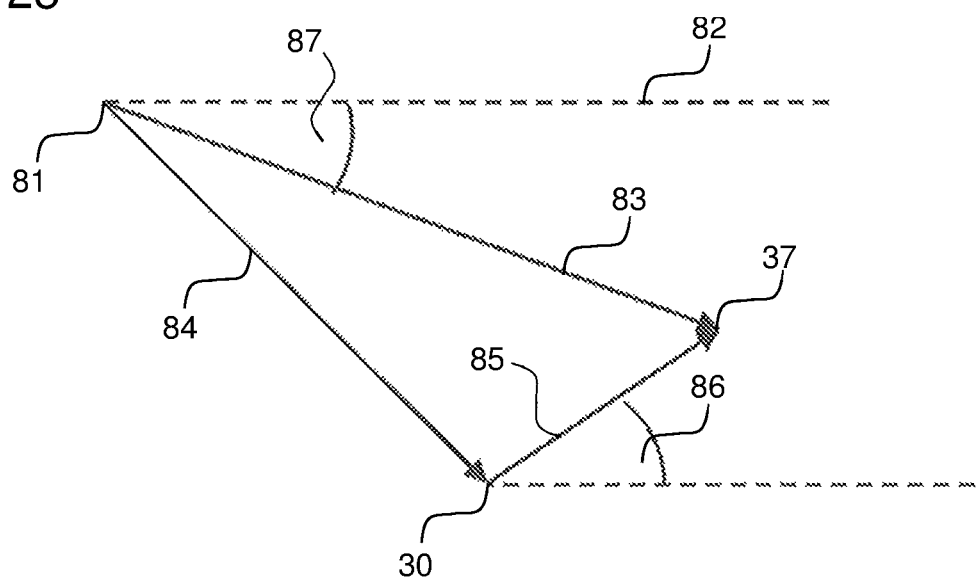

FIG. 25 shows a schematic illustration of the relative positions between a rotation axis of a diaphragm, the midpoint of a limited cross-sectional region of the illuminating light and an optical axis.

The same components and those having the same effect are generally identified in the figures with the same reference numerals.

A first embodiment of a light microscope 100 according to the invention is shown schematically in FIGS. 1 and 2. The light microscope 100 includes a light source 4, a condenser 20, an objective 50, a tube lens 55, image recording means 59 and electronic control means 60.

The illuminating light source 4 radiates illuminating light 5 along an optical axis 30 of the light microscope 100. The illuminating light 5 is focussed with optical means 20, which comprise here a condenser or a condenser lens 20, on a specimen plane 14. A specimen container with a specimen to be examined can be positioned on the specimen plane 14.

Downstream of the specimen plane 14, illuminating light 5 which has traversed the specimen is collected with the objective 50.

In the optical path downstream of the objective 50 the illuminating light is focussed on an image plane 58, in the example shown by means of the tube lens 55. In the image plane 58, image recording means 59, for example a camera sensor or chip, are arranged to record an image of the specimen.

According to the invention a phase contrast image is to be produced, thus an image, of which the brightness values depend upon a phase change experienced by the illuminating line upon traversing the specimen. In this connection, a first and a second image are hereby recorded which are offset, for example through a difference formation, to form the contrast image.

The first and the second image differ in that they are recorded with different settings of a diaphragm 40.

FIG. 1 shows a first diaphragm setting, in which the diaphragm 40 blocks out a part of the illuminating light 5 so that it does not reach the specimen plane 14.

In FIG. 2 the diaphragm 40 is in a second diaphragm setting, in which it covers another portion of the illuminating light 5.

In the embodiment shown the diaphragm 40 in FIGS. 1 and 2 is in the illuminating optical path in the region of a pupil plane 44, namely beside the condenser 20 and in an aperture diaphragm plane 44 which is conjugated with an objective pupil plane 53.

Furthermore the light microscope 100 comprises electronic control means 60, with which the diaphragm settings are determined and adjusted according to the invention.

Before the determination of the diaphragm settings according to the invention is explained, effects of the specimen container upon the measurements will be explained by reference to FIGS. 3 to 6.

Figure 3:
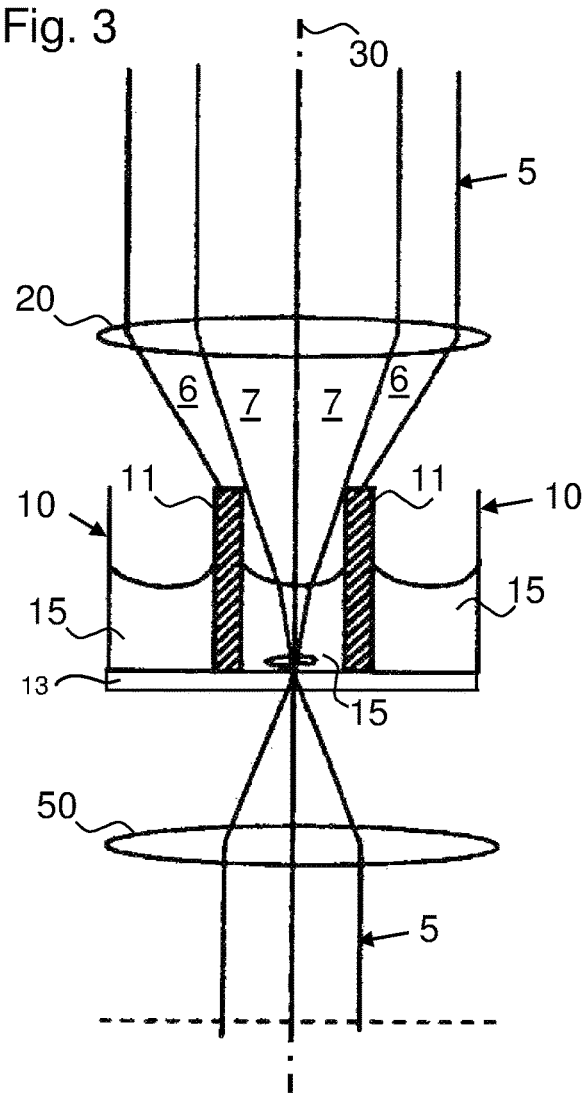
FIG. 3 shows a schematic illustration of components of a light microscope, wherein the illuminating light is cut by the specimen container.

FIG. 3 shows schematically the optical path of illuminating light 5 through a specimen 15. The illuminating light 5 is focussed with a condenser 20 on the specimen 15 and light 5 transmitted through the specimen 15 is captured with an objective 50.

In the embodiment shown a microtitre plate with a plurality of specimen containers 10 is used, in each of which there is a respective specimen 15. The specimen container is disposed on a specimen holder 13 (only shown in FIG. 3). The individual specimen containers 10 are separated from each other by walls 11 which extend along the optical axis of the light microscope. The wall 11 of the specimen container 10, through which the optical axis extends, cuts the illuminating light 5 in a cross-section transverse to the optical axis. A portion 6 of the illuminating light 5 is thereby blocked out and merely a portion 7 of the illuminating light 5 traverses the specimen 15 and is subsequently conveyed by the objective 50.

Figure 4:
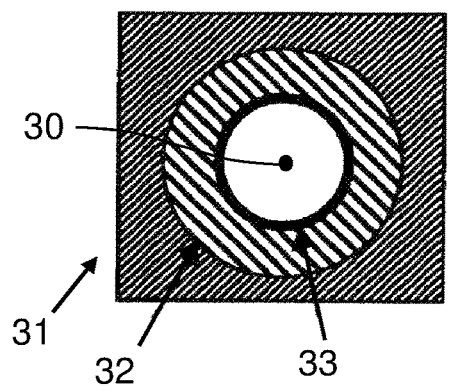
FIG. 4 shows a schematic illustration of a cross-section of the illuminating light for the situation of FIG. 3.

FIG. 4 shows schematically a cross-section 31 of the illuminating light 5 transversely to the optical axis for the situation of FIG. 3. In this cross-section a maximum cross-sectional area 32 of the illuminating light 5 is determined through the aperture of the objective. Due to the wall 11 of the specimen container 10, however, the maximum cross-sectional area 32 is not illuminated. Instead it is cut by the wall 11 to a limited cross-sectional region 33.

In the situation shown in FIGS. 3 and 4, a central region of the specimen 15 is examined within the specimen container 10. The cut through the walls 11 is hereby symmetrical to the optical axis 30 of the microscope. A mid-point of the cross-sectional region 33 limited by the wall 11 thereby lies precisely on the optical axis 30.

If on the other hand a non-central region of the specimen 15 is examined, the mid-point of the cross-sectional region 33 limited by the wall 11 deviates from the optical axis 30. This situation is shown in FIGS. 5 and 6.

Figure 5:
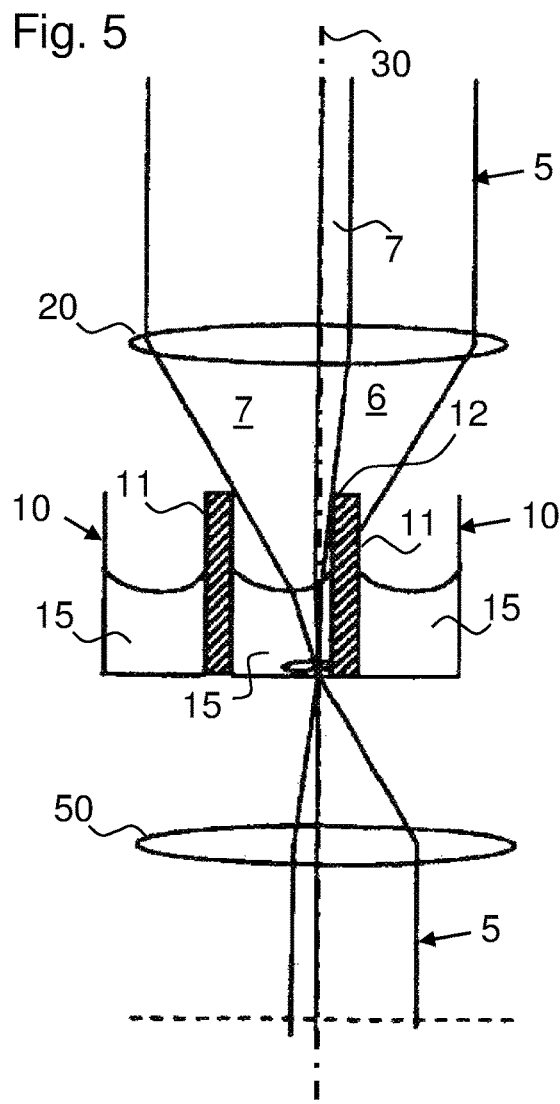
FIG. 5 shows a schematic illustration of components of a light microscope wherein the illuminating light is asymmetrically cut by the specimen container.

In FIG. 5 the specimen container 10 has been displaced so that the optical axis 30 extends through an edge region of the specimen 15 to be examined. As a consequence there is a wall region 12 closer to the optical axis 30 than the remaining regions of the wall 11. This distance is to be defined in a plane perpendicular to the optical axis 30. Through the closest lying wall region 12, a comparatively large portion 6 of the illuminating light 5 is blocked. The opposite region of the wall 11, on the other hand, does not block the illuminating light 5 or hardly blocks it.

Figure 6:
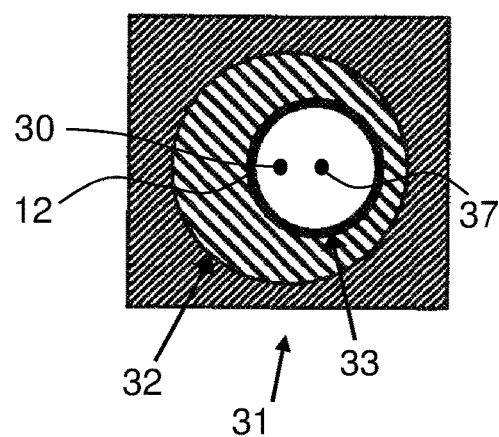
FIG. 6 shows a schematic illustration of a cross-section of the illuminating light for the situation of FIG. 4.

It can be seen in FIG. 6 that as a result of the cut through the wall 11 the mid-point 37 of the limited cross-sectional region 33 does not coincide with the optical axis 30.

If a diaphragm is brought into the optical path, difficulties arise which are shown in FIGS. 7 to 10 and which are resolved through the method according to the invention and the light microscope according to the invention.

FIGS. 7 and 9 show schematically situations in which the diaphragm 40 has been brought into the optical path of the illuminating light 5. In both cases a diaphragm edge 41 of the diaphragm 40 contacts the optical axis 30. The diaphragm 40 thereby covers in both cases a respective half of the cross-section of the illuminating light 5 and thus also of the objective aperture 32.

Through the wall 11 of the specimen container 10 in the example shown, however, merely a limited cross-sectional region 33 is left free, of which the mid-point 37 does not coincide with the optical axis 30, as also shown in FIG. 8. The region 34 covered in this case by the diaphragm 40 does indeed cover half of the objective aperture 34 but not the half of the limited cross-sectional region 33 of the illuminating light.

In the situation of FIG. 9 the diaphragm 40 covers precisely the other half of the cross-section of the illuminating light 5. The region 35 of the limited cross-sectional region 33 hereby covered is shown in FIG. 10.

It can be seen that the portion 34 of the limited cross-sectional region 33 covered by the diaphragm in FIG. 8 is significantly smaller than the second covered portion 35 of FIG. 10, although in both cases a respective half of the maximum cross-section 32 of the illuminating light is covered.

If two images of the specimen are recorded with these two diaphragm settings, these images cannot meaningfully be offset to a contrast image.

This problem is based upon the covering of the illuminating light, asymmetrical relative to the optical axis, through the wall of the specimen container. These disadvantageous effects of the wall of the specimen container can be influenced by further effects.

Figure 11:
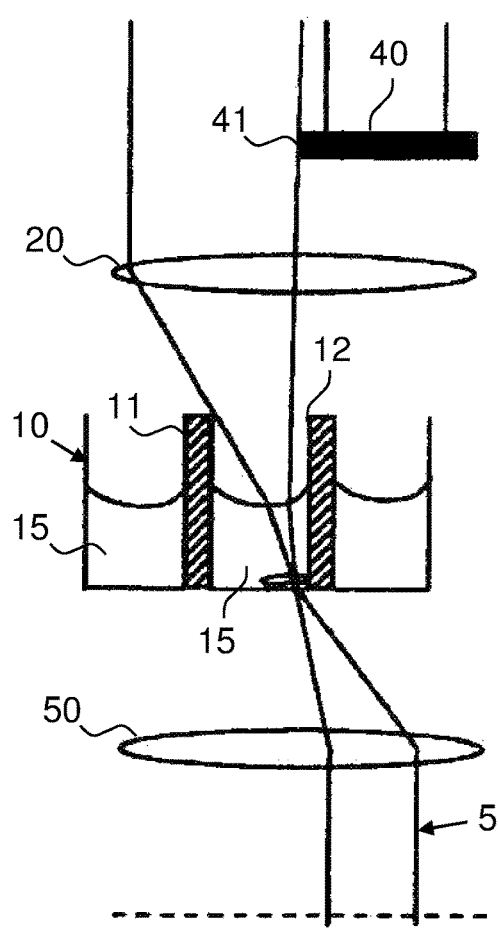
FIG. 11 shows a schematic illustration of components of a light microscope, wherein a diaphragm is guided into a first diaphragm setting and wherein the illuminating light is cut asymmetrically by the specimen container, wherein a surface curvature of the specimen liquid is considered.
Figure 13:
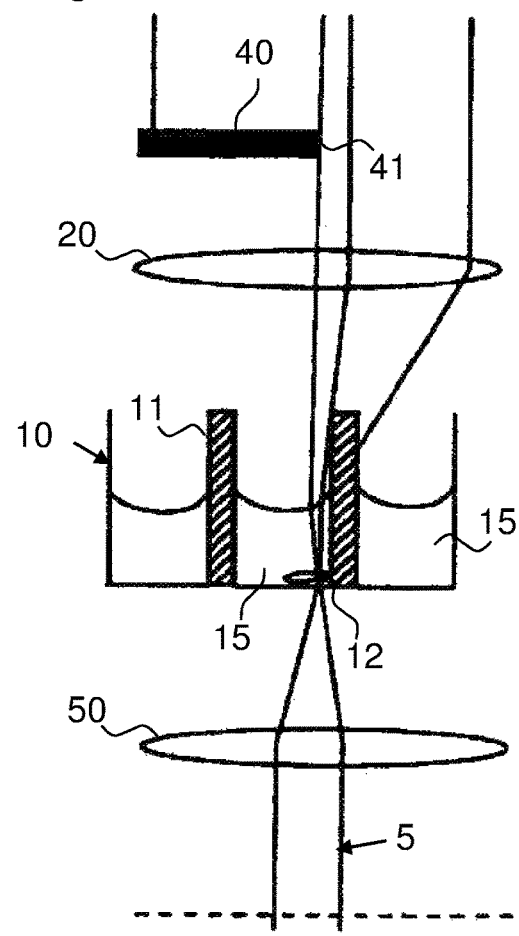
FIG. 13 shows a schematic illustration of components of a light microscope, wherein a diaphragm is guided into a second diaphragm setting and wherein the illuminating light is asymmetrically cut by the specimen container, wherein a surface curvature of the specimen liquid has been considered.
Figure 12:
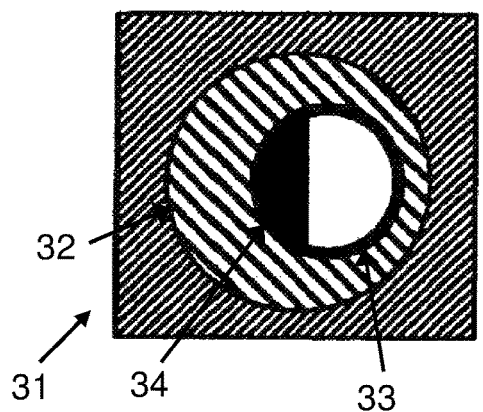
FIG. 12 shows a schematic illustration of a cross-section of the illuminating light for the situation of FIG. 11.
Figure 14:
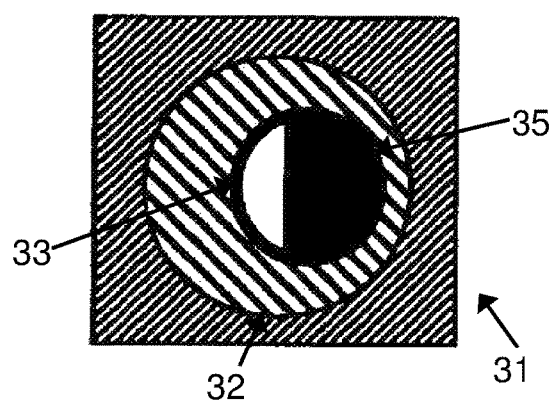
FIG. 14 shows a schematic illustration of a cross-section of the illuminating light for the situation of FIG. 13.

This is illustrated by reference to FIGS. 11 to 14. FIGS. 11 and 13 in turn show two situations, in which a respective half of the cross-section of the illuminating light 5 is covered with the diaphragm 40. FIGS. 12 and 14 show the associated cross-sections 31 of the illuminating light 5 transversely to the optical axis 30.

In FIGS. 11 and 13 the specimen is an aqueous solution which has a curved surface due to surface stresses. The incident illuminating light 5 is broken on this surface. The angle of inclination of the surface of the specimen liquid is thereby position-dependent. Depending upon the position of the optical axis relative to the centre of the specimen container, incident illuminating light thus reaches the surface of the specimen liquid at different angles of inclination. The position of the cross-sectional region limited by the wall of the specimen container is hereby changed.

The surface form of the specimen liquid depends upon different factors, in particular the material of the walls of the specimen container, the diameter of the specimen container, the type and viscosity of the specimen liquid and the mechanical manipulation of the liquid, thus whether for example the specimen has been stirred once again after being poured into the specimen container.

The limited cross-sectional region 33 shown in FIGS. 12 and 14 hereby arises, which is not halved with the diaphragm settings shown in FIGS. 11 and 13. A meaningful offset of images hereby recorded is not therefore possible or is only possible with difficulties.

The solution to this problem will be explained with the method according to the invention and the light microscope according to the invention with reference to FIG. 15. This figure shows a cross-section 31 of the illuminating light transversely to the optical axis. Here also, a maximum cross-section 32 of the illuminating light determined by the objective is not completely blocked out. Instead, the illuminating light is cut by the wall of the specimen container. The limited cross-sectional region 33 hereby caused, circular in the example shown, lies spaced apart from the centre of the maximum cross-section 32.

In the example shown, however, precisely a half of the limited cross-sectional region 33 is advantageously covered as a first covered cross-sectional area portion 34.

If the diaphragm is moved from this first diaphragm setting into a second diaphragm setting, in which it covers precisely the other half of the cross-section of the illuminating light, the other half of the limited cross-sectional region 33 is also thereby covered. The cross-sectional area portion of the illuminating light which traverses the specimen in the first and in the second diaphragm position and is demonstrated is of equal size. Differences in the image brightnesses of the two images recorded in this way are consequently based solely upon the specimen and not upon the position of the specimen container. Advantageously, therefore, a phase contrast image can be calculated from the two images.

FIG. 16 shows a situation, in which another region of the specimen is examined. This region also lies outside of the centre of the specimen container, whereby the cross-sectional region 33, limited by the wall of the specimen container, of the illuminating light lies in turn at the edge of the objective aperture 32. Through a suitable division of the limited cross-sectional region 33 into two equal sized regions, in the present case into two halves, images with the same illumination strength can also be recorded here in the first and second diaphragm setting.

In order to determine two diaphragm settings, in which respectively equal sized portions of the limited cross-sectional region 33 are covered, a straight line of symmetry can be determined. The regions covered by the diaphragm in the two diaphragm settings are then intended to lie axis-symmetrically to the straight line of symmetry. The diaphragm itself thus also lies symmetrically to the straight line of symmetry. In the situations of FIGS. 15 and 16 the straight line of symmetry is the separating line of the covered cross-sectional area portion 34 in relation to the portion 36 of the limited cross-sectional region 33 left free.

A method variant according to the invention to determine the straight line of symmetry 38 is described by reference to FIG. 17. A schematic cross-section perpendicular to the optical axis 30 is shown. A maximum cross-section 32 of the illuminating light is in turn predefined by the objective. The optical axis 30 can lie in the mid-point of this maximum cross-section 32. The cross-section of the illuminating light is cut, however, through the wall of the specimen container to the limited cross-sectional region 33.

In the case of a specimen container, of which the wall is round or ring-shaped in cross-section, the limited cross-sectional region 33 also has a round form. The mid-point 37 thereof lies in the example shown spaced apart from the optical axis 30 and thus spaced apart from the centre of the maximum cross-sectional region 32. According to the invention the position of the specimen container can be determined relative to the optical axis 30. This can be achieved for example by means of a mechanical positioning system of the specimen holder. Alternatively, an image of the specimen can be recorded, in particular an overview measurement with limited magnification, and using image processing means the position of the specimen container is determined relative to the optical axis. The wall region of the specimen container lying closest to the optical axis can hereby be determined. A perpendicular to a tangential plane can thus be determined on the closest lying wall region. This perpendicular can be fixed as a straight line of symmetry 38.

In FIG. 17, the position of the limited cross-sectional region 33 is identified by 12', whereby this is fixed by the closest lying wall region 12 of the specimen container. The straight line of symmetry 38 extends from 12' through the optical axis 30 and through the mid-point 37 of the limited cross-sectional region 33.

By way of a first and a second diaphragm setting, those positions of the diaphragm which lie in a mirror image to the straight line of symmetry 38 are set.

In the embodiment shown a circle segment shaped diaphragm is used which leaves free a circle segment with angle a. This results in a first free cross-sectional area portion 36 with an opening angle a. A first image of the specimen can be recorded with this setting. The diaphragm is then moved to a second diaphragm setting, in which it leaves free a second cross-sectional area portion 39 and covers the remaining cross-sectional area of the illuminating light. The two cross-sectional areas 36 and 39 left free are thereby selected in a mirror image to the straight line of symmetry 38, that is to say the two angles b1 and b2 of the cross-sectional areas 36 and 39 left free relative to the straight line of symmetry 38 are of equal size.

FIG. 17 shows that different pairs of first and second diaphragm settings are possible with the predefined diaphragm form so long as the angles b1 and b2 are selected to be of equal size.

A particularly good image contrast is achieved if the cross-sectional areas 36 and 39 left free as far as possible leave free half of the limited cross-sectional region 33. In this connection the diaphragm can be positioned in the first and in the second diaphragm setting with a respective diaphragm edge adjacent to the straight line of symmetry 38. The angles b1 and b2 are in this case equal to zero.

A rotation axis of the diaphragm 40 must not coincide, however, with the optical axis 30. For example the rotation axis can lie spaced apart from the optical axis 30 in dependence upon the installation and adjustment of the diaphragm 40. A displacement of the optical axis 30 relative to the rotation axis can also take place upon a change in the switchable components in the optical path. For example a change of objective can lead to a displacement of the optical axis 30.

In these cases a diaphragm edge preferably does not extend, in the first and second diaphragm setting, through the optical axis 30. The spatial correlations are described in more detail with reference to FIG. 25. This shows a section perpendicular to the optical axis 30. Besides the optical axis 30, the rotation axis 81 of the diaphragm and the mid-point 37 of the illumination cross-section which is limited by the walls of the specimen container are shown.

By way of a straight line of symmetry, in the present case a straight line or a vector 83 can be used which extends from the rotation axis 81 to the mid-point 37.

The connecting vector 83 is at an angle 87 to a reference direction 82 which also represents a possible orientation of the diaphragm edge. By way of first and second diaphragm settings, however, the angle 87 is selected preferably at 0° and 180°. The diaphragm edge thus extends in both cases through the mid-point 37 and respectively covers a half of the limited cross-sectional region of the illuminating light.

The determination of the two diaphragm settings can take place through a trial and error method. In this method a contrast image of the specimen is produced with any given pairs of diaphragm settings. The diaphragm settings of a pair can respectively differ from each other by a rotation angle of 180°. Alternatively, the two diaphragm settings can be determined by determining the positions of the mid-point 37 and the rotation axis 81.

In a calibration measurement, initially the position of the rotation axis 81 relative to the optical axis 30, that is to say the connecting vector 84, can be determined. For example, the progression of the diaphragm edge with different rotation angles can be observed in pupil images. The connecting vector 84 is independent or extensively independent of which specimen and which specimen region are observed within the specimen.

The relative position of the mid-point 37 to the optical axis 30, that is to say the connecting vector 85, can be calculated from a knowledge of the geometry of the specimen container and a knowledge of the current observation position. Alternatively, the mid-point 37 can also be determined by an image recording. The orientation of the connecting vector 85 can be indicated by an angle 86.

The desired connecting vector 83 can then be calculated by adding the connecting vectors 84 and 85.

In the case of a change of optical components, for example an exchange of the objective, the above-described steps can be carried out once again in order to determine the connecting vector 83.

A further embodiment of a light microscope 100 according to the invention is shown schematically in FIG. 18.

A specimen container 10 is shown, of which the centre lies spaced apart from the optical axis 30. In order to be able to examine different regions within the specimen container 10, positioning means 18 are present. A specimen table of the light microscope and thus also the specimen container 10 can be moved with these positioning means 18.

In addition a diaphragm 40 is provided which can be moved with a diaphragm motor 43. In particular the diaphragm 40 can be rotated around the optical axis 30 as a rotation mid-point. The diaphragm motor 43 is controlled with control means 42. An automatic control of the positioning means 18 and the control means 42 for the diaphragm motor 43 can take place with the electronic control means 60. These can be arranged within a housing of the light microscope 100 or also be configured through an external computer outside of the microscope housing.

In the embodiment shown, the diaphragm 40 leaves free a circle segment with an opening angle of less than 180°. According to a variant, this diaphragm 40 is rotated during the exposure time around a certain rotation angle for the recording of the first image. It can alternatively be provided that the diaphragm 40 is rotated continuously and, for the recording of the first image, a brief light pulse is emitted only when the diaphragm 40 is at a certain rotation position. The recording of the second image takes place in both cases in a similar way, whereby the regions covered in the first and second diaphragm setting lie symmetrically to the above-described straight line of symmetry.

Instead of the diaphragm 40 shown in FIG. 18 with circle segment form, it is also possible to use a diaphragm with linear diaphragm edge which is positioned so that it contacts the optical axis 30.

A further embodiment of a light microscope according to the invention is described by reference to FIG. 24. This differs from the light microscope of FIG. 18 in the design of the diaphragm 40. In FIG. 24 the diaphragm 40 is configured as a diaphragm group 40 with a plurality of single diaphragms 46. The single diaphragms 46 are arranged rigidly relative to each other in the diaphragm group 40. By rotating the diaphragm group 40, precisely one of the respective single diaphragms 46 can be brought into the optical path of the illuminating light. The single diaphragms 46 respectively comprise a diaphragm edge. These are orientated so that they are in different orientations relative to each other when they are respectively brought into the optical path. The number of possible diaphragm settings corresponds to the number of single diaphragms 46.

The diaphragm group 40 further has at least one free passage 45. If the diaphragm group 40 is rotated so far that the passage 45 lies in the optical path of the illuminating light, no illuminating light is blocked by the diaphragm group 40. This can be desirable for example for fluorescence measurements. Through a free passage 45, it is advantageous that the diaphragm group 40 does not have to be removed from the optical path of the illuminating light in order to record a specimen image without cutting through the diaphragm group 40.

A diaphragm 40 of a further embodiment of a light microscope according to the invention is shown in FIG. 19. Here, the diaphragm 40 comprises an array 48 of liquid crystal elements. In the situation shown, a half of the liquid crystal elements is switched to opacity while the other half of the array 48, shown in white, is switched to transparency.

In the example shown, the array 48 has a round form and is surrounded by a mechanical additional diaphragm 49.

Having regard to FIGS. 1, 2 and 7 to 14, embodiments have been described, in which the diaphragm 40 is arranged between the light source 4 and the specimen plane 14 or specimen 15. Studies have shown that such an arrangement of the diaphragm 40 is particularly advantageous if the illuminating aperture is larger than the detection aperture.

The cutting of the illuminating light through the walls of the specimen container reduces, however, the illuminating aperture. This is thus often smaller than the detection aperture. Trials have shown that in this case images with better contrast can be produced if the diaphragm 40 is arranged in the detection optical path, that is to say between the specimen plane 14 or specimen 15 and image recording means.

Embodiments with such a diaphragm arrangement are shown in FIGS. 20 to 23.

FIGS. 22 and 23 show components of a light microscope. Apart from the arrangement of the diaphragm 40 in the detection optical path, this configuration corresponds to the variant shown in FIGS. 7 and 9. FIGS. 22 and 23 show two different diaphragm settings, in which different sized portions of the cross-sectional region of the illuminating light which is limited by the walls 11, 12 of the specimen container 10 are covered. The regions covered by the diaphragm 40 in the two diaphragm settings thus correspond to those which are shown in FIGS. 8 and 10.

According to the invention the image recording does not take place with these diaphragm settings. Instead diaphragm settings are carried out, in which the diaphragm 40 covers equal sized regions of the limited cross-sectional region. In this connection, for example, a diaphragm edge of the diaphragm 40 can lie in both diaphragm settings symmetrically to a straight line extending through the mid-point of the limited cross-sectional region.

The arrangement of the diaphragm 40 in the detection optical path is shown in more detail in FIGS. 20 and 21. These figures correspond, apart from the arrangement of the diaphragm 40, to FIGS. 1 and 2. In FIGS. 20 and 21 the diaphragm 40 is arranged between the objective 50 and a tube lens 55. The diaphragm 40 is preferably positioned in a pupil plane which is conjugated with the objective pupil plane, that is to say the objective pupil plane is imaged into this pupil plane. In principle, however, the diaphragm 40 can also be arranged in the objective pupil plane itself.

It is possible according to the invention, with all variants of the diaphragms and diaphragm positions shown, for two different diaphragm settings to be determined and adjusted, in which equal sized portions of the cross-sectional region of the specimen container, limited by the wall of the specimen container, are left free. Advantageously, a contrast image of particularly good quality can be produced from two images recorded in this way.

List of Reference Numerals
    100 Light microscope
    4 Illuminating light source
    5 Illuminating light
    6 Blocked out portion of the illuminating light
    7 Transmitted portion of the illuminating light
    10 Specimen container
    11 Wall of the specimen container
    12 Closest lying wall region to the optical axis
    14 Specimen plane
    15 Specimen
    18 Positioning means
    29 Optical means, condenser
    30 Optical axis
    31 Cross-section transverse to the optical axis
    32 Maximum cross-section of the illuminating light
    33 Limited cross-sectional region
    34 First covered cross-sectional area portion
    35 Second covered cross-sectional area portion
    36 First cross-sectional area portion left free
    37 Mid-point of the limited cross-sectional region 33
    38 Straight line of symmetry, connecting straight line
    39 Second cross-sectional area portion left free
    40 Diaphragm
    41 Diaphragm edge
    42 Control means for the diaphragm motor
    43 Diaphragm motor
    44 Aperture diaphragm plane
    45 Free passage of the diaphragm group
    46 Single diaphragms
    48 Array of liquid crystal elements as diaphragm
    49 Additional mechanical diaphragm
    50 Objective
    53 Objective pupil plane
    55 Tube lens
    58 Image plane
    59 Image recording means
    60 Electronic control means
    81 Rotation axis of the diaphragm
    82 Reference direction; momentary orientation of the diaphragm edge
    83 Connecting vector from the rotation axis 81 of the diaphragm to the mid-point 37
    84 Connecting vector from the optical axis 30 of the diaphragm to the mid-point 30
    85 Connecting vector from the optical axis 30 to the mid-point 37
    86 Angle of the connecting vector 85

87 Angle between a reference direction and the connecting vector 83

The invention claimed is:

1. A method for recording images with a light microscope, comprising:
arranging a specimen container with a specimen on a specimen holder of the light microscope,
guiding illuminating light onto the specimen,
bringing a diaphragm for restricting the illuminating light into an optical path of the illuminating light,
calculating a phase contrast image based on a difference between brightness values of image pixels of an illuminated specimen region of a first image and an illuminated specimen region of a second image, wherein the illuminated specimen region of the first image is identical to the illuminated specimen region of the second region, and wherein the illuminated specimen region of the first image and the illuminated specimen region of the second region are illuminated with different diaphragm settings in a pupil plane, for a limited cross-sectional region of the illuminating light which is defined by a wall of the specimen container, those diaphragm settings are determined and set as diaphragm settings, in which the diaphragm covers equal sized portions of the limited cross-sectional region,
wherein the illuminating light is restricted to the limited cross-sectional region by the wall of the specimen container, in a cross-section transverse to an optical axis of the light microscope.

2. The method of claim 1,
wherein
the diaphragm is brought into the optical path between the specimen and image recording means.

3. The method of claim 1,
wherein
the diaphragm is brought into the optical path between an illuminating light source and the specimen.

4. The method of claim 1,
wherein
a mid-point of the limited cross-sectional region of the illuminating light is determined,
as a straight line of symmetry a straight line extending through the mid-point is determined, and
as a first and second diaphragm setting those diaphragm settings are set, in which the area covered by the diaphragm in the first diaphragm setting and the area covered by the diaphragm in the second diaphragm setting lie symmetrical to the straight line of symmetry.

5. The method of claim 4,
wherein
the diaphragm settings differ in a rotation angle of a diaphragm edge of the diaphragm around a rotation axis, and
as a straight line of symmetry a straight line is fixed which cuts the mid-point and the rotation axis.

6. The method of claim 5,
wherein
a position of the rotation axis is determined in a calibration measurement.

7. The method of claim 6,
wherein
at least two pupil images are recorded in the calibration measurement, wherein the diaphragm edge is brought into different rotation angles around the rotation axis, the position of the rotation axis is determined from the orientations of the diaphragm edge in the different pupil images.

8. The method of claim 1,
wherein
as a straight line of symmetry, a connecting straight line from the optical axis or from the rotation axis to a closest lying wall region of the specimen container is determined,
wherein the closest lying wall region is that part of the wall of the specimen container which is closest to the optical axis or to the rotation axis, and
as first and second diaphragm settings, those settings are applied, in which the area covered by the diaphragm in the first diaphragm position and the area covered by the diaphragm in the second diaphragm position lie symmetrical to the straight line of symmetry.

9. The method of claim 4,
wherein
an overview image of the specimen is recorded for the purpose of determination of the first and second diaphragm setting in an overview measurement,
the position of a wall of the specimen container is determined in the overview image by means of image processing means, and
a closest lying wall region to the optical axis is determined from the determined position of the wall; or the mid-point of the limited cross-sectional region is determined with the determined position of the wall.

10. The method of claim 1,
wherein
for the purpose of determination of the first and second diaphragm settings the diaphragm is brought into the optical path of the illuminating light, the diaphragm is rotated and in different rotation positions of the diaphragm test images of the specimen are recorded, a respective pair of test images, for which associated rotation positions of the diaphragm are rotated by 180° relative to each other, are set against each other having regard to an evaluation criterion, one of the respective pair of test images is selected with the evaluation criterion and associated two diaphragm settings are set as the first and second diaphragm settings.

11. The method of claim 1,
wherein
the diaphragm is rotated continuously,
a camera sensor of the light microscope is exposed via multiple rotations of the diaphragm for a first image recording,
a light pulse as illuminating light is sent for the first image recording whenever the diaphragm is at a first rotation position as a first diaphragm setting, and otherwise no illuminating light is emitted,
the camera sensor of the light microscope is exposed via multiple rotations of the diaphragm for a second image recording,
a light pulse as illuminating light is sent for the second image recording whenever the diaphragm is at a second rotation position as a second diaphragm setting, and otherwise no illuminating light is emitted.

12. The method of claim 1,
wherein
the diaphragm has a circle segment form, of which the circle segment opening has a tip which contacts the optical axis of the light microscope,
the diaphragm is rotated continuously, as a first diaphragm setting the diaphragm moves over a first rotation region and as a second diaphragm setting the diaphragm moves over a second rotation region.

13. The method of claim 11, wherein a test image is recorded with at least one of: the first and the second diaphragm setting, an image brightness of the recorded test image or the recorded test images is determined, an exposure time of a camera chip of the light microscope is fixed with the determined image brightness so that a desired image brightness is achieved with the first and second diaphragm settings, and a rotation speed of the diaphragm is selected so a time which the diaphragm requires to move over the first and the second rotation region is respectively equal to the fixed exposure time.

14. A light microscope, comprising:

a specimen holder for holding a specimen container with a specimen, optical means for guiding illuminating light onto the specimen, a diaphragm which can be arranged for restricting the illuminating light in an optical path of the illuminating light, wherein a phase contrast image is calculated using a controller based on a difference between brightness values of image pixels of an illuminated specimen region of a first image and an illuminated specimen region of a second image, wherein the illuminated specimen region of the first image is identical to the illuminated specimen region of the second region, and wherein the illuminated specimen region of the first image and the illuminated specimen region of the second region are illuminated with different diaphragm settings in a pupil plane, the controller is adapted, for a limited cross-sectional region of the illuminating light which is defined through a wall of the specimen container, to determine and set as diaphragm settings those diaphragm settings, in which the diaphragm covers equal sized portions of the limited cross-section region, wherein restricting the illuminating light to the limited cross-sectional region in a cross-section transversely to an optical axis of the light microscope can occur through the wall of the specimen container.

15. The light microscope of claim 14, wherein the light microscope is adapted to carry out the method according to claim 1.

16. The light microscope of claim 14, wherein an objective for guiding illuminating light coming from the specimen to the image recording means is provided, and the diaphragm is arranged in a plane conjugated to an aperture plane of the objective.

17. The light microscope of claim 14, wherein the diaphragm is designed as a diaphragm group with a plurality of single diaphragms, and the controller is adapted to respectively bring a different single diaphragm into the optical path for the different diaphragm settings.

18. The light microscope of claim 14, wherein the diaphragm is light-impermeable in a spectral range of the illuminating light and is light-permeable in a different spectral range from this.

19. The light microscope of claim 14, wherein the diaphragm comprises a two-dimensional array of liquid crystal elements which can be switched between transparency and opacity, and the controller is adapted, for the setting of the first and second diaphragm setting, to switch certain liquid crystal elements to opacity.

20. The light microscope of claim 14, wherein the controller is adapted to set different positions of the specimen holder for an examination of different regions of the specimen in the specimen container, the controller is adapted to determine a first and a second diaphragm setting for each set position of the specimen holder and to produce a contrast image for each set position of the specimen holder.

* * * * *